US012606070B2

(12) United States Patent
    Alvarez

(10) Patent No.: US 12,606,070 B2
(45) Date of Patent: Apr. 21, 2026

(54) SYSTEM FOR PREPARATION AND RAPID INSTALLATION OF PORCELAIN SLABS

(71) Applicant: PORCEBELLA GROUP, LLC, Houston, TX (US)

(72) Inventor: Rafael Alvarez, Houston, TX (US)

(73) Assignee: Rafael Alvarez, Houston, TX (US)

( * ) Notice: Subject to any disclaimer, the term of this patent is extended or adjusted under 35 U.S.C. 154(b) by 76 days.

(21) Appl. No.: 18/805,681

(22) Filed: Aug. 15, 2024

(65) Prior Publication Data

US 2025/0058689 A1    Feb. 20, 2025

Related U.S. Application Data

(60) Provisional application No. 63/601,938, filed on Nov. 22, 2023, provisional application No. 63/533,166, filed on Aug. 17, 2023.

(51) Int. Cl.
    *B60N 3/00* (2006.01)
    *B28B 11/12* (2006.01)
(52) U.S. Cl.
    CPC .............. *B60N 3/001* (2013.01); *B28B 11/12* (2013.01)

(58) Field of Classification Search
    CPC ... B60R 9/02; B60P 3/002; B60P 7/10; B28B 11/12; B28D 7/043
    See application file for complete search history.

(56) References Cited

U.S. PATENT DOCUMENTS

| | | | | |
|---|---|---|---|---|
| 4,864,939 | A | * | 9/1989 | Bailey ..................... B60P 3/002 108/44 |
| 2010/0307088 | A1 | * | 12/2010 | Hsieh ........................ B32B 7/12 52/309.3 |

* cited by examiner

*Primary Examiner* — JaMel M Nelson
(74) *Attorney, Agent, or Firm* — HULSEY P.C.

(57) ABSTRACT

A system for use in one-day bathroom or other residential room remodeling projects through the rapid forming and preparing of a porcelain slab, including a porcelain slab cutting table consisting of components to cut porcelain slabs to desired size, without breakage. The system further includes a mobile porcelain slab cutting table attachment allowing for efficient cutting of the porcelain slabs in a field. A process for installation of large porcelain slabs using commercially available materials, along with unique methodology and tools to permanently and securely bond the porcelain slabs to shower walls, and process for installing a porcelain shelf to a wall are disclosed. The system allows a user to complete full installation within 8-16 working hours by integrating cutting and total shower remodel from demolition to finished product using porcelain slabs, achieving significant time and cost savings.

20 Claims, 15 Drawing Sheets

500

504

502

SYSTEM FOR PREPARATION AND RAPID INSTALLATION OF PORCELAIN SLABS

REFERENCE TO RELATED APPLICATIONS

The present application claims priority from U.S. Provisional Patent Application Ser. No. 63/533,166 filed Aug. 17, 2023, which is incorporated herein in its entirety and referenced thereto.

BACKGROUND OF THE INVENTION

Field of the Invention

The present invention relates to cutting, transportation and installation of porcelain slabs, and in particular, relates to a system for preparation and installation of porcelain slabs, including a porcelain slab cutting table, a mobile porcelain slab cutting table attached to a porcelain slab transport vehicle, a process of rapidly installing large porcelain slabs in confined spaces, and a process of installing a porcelain shelf to a shower wall.

Description of the Prior Art

The current stone surfacing market uses large slabs of natural stone or engineered slabs such as quartz, to create surfaces such as kitchen countertops, vanities, and other vertical applications such as fireplace or television surrounds, and shower walls and floors. The current stone surfacing market is dominated by quartz and natural stone, primarily marble, granite, quartzite, and solid surface, typically in thicknesses of 20 mm to 30 mm.

The current "one-day-bath" market is based on the ability to completely remodel a bathroom wet area (shower and/or tub), from total demolition down to the studs, to a finished new shower, in one to two days. In this market, where homes are normally occupied, speed is of the essence as home residents are not willing to be without the use of their shower for more than two days. Currently this market is dominated by walls made of acrylic (plastic) due to its ease of handling, cutting, and installation.

Porcelain slabs are a relatively new material in the stone surfacing market. Porcelain, which is a non-porous printed and sintered material, has existed for thousands of years— but in small formats. Until recently, porcelain tiles were only as large as 48"×48". That size, while quite larger than the previous 12"×12" tiles, still does not allow for grout-less applications like standard-size kitchen islands or grout-less showers, as the normal width for a tub/shower is 60 inches. About 10 years ago, porcelain started to be produced in large format slabs—typically 126"×60" and at thicknesses anywhere from 3 mm to 20 mm. At such sizes, and particularly at a thickness of 6 mm, porcelain slabs became a viable replacement for natural stone, quartz, or acrylic surfacing materials, and have unique and valuable properties. For example, porcelain slabs are printed with high-definition printers, and as such allow for design possibilities that cannot be met with other engineered materials, like quartz. Porcelain slabs can be made into reproductions of anything that may be photographed, or even created as a computer model, such as marble, precious stones, precious woods, concrete, metal, etc. Most of the printed porcelain slabs currently produced are reproductions of marble. However, porcelain has some properties that are superior to marble, such as a very low level of porosity preventing water absorption. In contrast, marble is a porous and soft material, and therefore stains easily. Further, marble breaks down with time and decays with some liquids or chemicals. Given that marble is a soft material, the thickness of marble slabs is typically 20 or 30 mm, indicating they are extremely heavy and require multiple people to carry and place. Because of its low level of porosity, porcelain does not stain like marble and therefore is a better material to use in applications such as shower walls. Furthermore, with thicknesses at 6 mm, porcelain slabs are much thinner than marble while still having the strength required for the vertical shower closeout application at a much lesser weight, which enables the porcelain slab to be carried and placed by only two people, compared to many more people, or mechanical lifts, required for marble.

The main problem with porcelain slabs, which has prevented their mass adoption, is that porcelain is a very hard and brittle material so it is difficult to handle and cut with present tools in the stone industry. Fabricators typically attempt to cut porcelain slabs with equipment used to cut other stone based products, but cutting porcelain using these methods is much slower and often results in cracking the porcelain slabs. For these reasons, fabricators generally dislike utilizing porcelain slabs. Therefore, the construction industry has not widely embraced porcelain slabs yet despite their other advantages.

The "one-day bath" market, as previously described, is dominated by acrylic sheets which are each cut and glued to a prepared surface and have the look and feel of plastic as opposed to tile or stone. The acrylic installation crews do not typically have experience in tile or stone materials. While companies in this industry recognize the superior look and feel of porcelain slabs and consider it a more luxurious customer offering, they are afraid to introduce porcelain due to its brittleness and the current long installation time.

Fabricators discovered that porcelain slabs behave more like glass than stone and have started using computer-controlled equipment from the glass industry to cut porcelain slabs in a controlled manufacturing facility, with much greater speed, reliability, and a minimum of breakage compared to using either traditional saws, or portable cutting devices in the field. The disadvantage to this method is that the computer-controlled cutting equipment is driven by a Computer-Aided Design (CAD) drawing which needs to be carefully prepared in advance. It normally takes three to four weeks, from demolition to finished product to do a shower remodel using this process. This timing does not work for the "one-day bathroom remodel market", in which speed is of the essence. Therefore this "one-day bath market" is currently dominated by other materials that are inferior to porcelain, mostly acrylic. Attempts have been made to cut porcelain slabs on site but suffer from excessive breakage due to inadequate tools, processes, and training.

Porcelain slabs can be cut with the same score-and-snap techniques used for glass. Therefore, some porcelain slab manufacturers have developed cutting tools and tables to be used for this purpose. The score-and-snap cutting tools consist of a rail, a few suction cups, and a scoring wheel. After scoring the porcelain at the desired location, the operator then "snaps" the piece along the score line.

For the score-and-snap technique to work, it is critically important that the porcelain slab rests on a perfectly flat surface. Specialized portable tables for cutting large format porcelain slabs (measuring up to 130" in length) have been constructed, but to allow for transportation inside a regular size van, these tables are only half as long as a full-size slab. Therefore, the design requires joining together two tables, each measuring approximately 60" to 72".

The design intent for available tables is that both table halves are transported to the site where the cutting will take place. There, they are joined to create a long surface sufficiently large to support a full size slab. However, the two table halves must be perfectly even (flush) with each other. Otherwise, the porcelain slab will crack during the score-and-snap process. These mobile tables are light in weight as they are intended to be mobile, but oftentimes they are flimsy and both halves do not connect evenly with each other, which is the main reason slabs break when cutting in the field. Furthermore, portable porcelain tables generally only employ uncoated aluminum. Sliding large porcelain slabs on uncoated aluminum creates much friction and the corresponding wear and tear on supporting elements such as legs and other brackets.

Setting up current portable porcelain slab cutting tables correctly at a job site is a time-consuming process, particularly in uneven terrain. Since this setup process is not always performed correctly, costly, large porcelain slabs are often broken in the field.

In addition, the large porcelain slabs are typically transported using a traditional wooden A-frame, typically placed inside a van or trailer. However, if slabs are not placed and secured perfectly, they will likely break during transportation to the job site. A recent development is to use glass vehicles, such as a van with a glass rack attached to it, to safely transport porcelain slabs.

An exemplary environment 10 of a transport vehicle 12 having a transport attachment 14 is shown in FIG. 1, in accordance with prior art. As can be seen, transport vehicle 12 includes a transport attachment 14 connected at one side. Transport attachment 14 includes a frame 16 connecting transport vehicle 12 in parallel. Frame 16 encompasses a base support structure 18 for placing the large porcelain slabs. After cutting, the large porcelain slabs are loaded vertically with support from frame 16 and base support structure 18 at the side of transport vehicle 12.

Several devices for mounting work tables and/or transporting large panels such as porcelain slabs have been disclosed in the past. One such example is disclosed in a U.S. Pat. No. 7,802,708, entitled "Clamp-on material carrier for a panel truck" ("the '708 Patent"). The '708 Patent discloses a panel truck provides a material carrier made up of a fixed frame clamped to a rain gutter of the truck and a movable frame that is able to be drawn toward the fixed frame to clamp panels between the frames. The fixed frame is further secured to the truck by a clamp leg that may be drawn toward an interior panel of the truck so as to apply clamping action between the fixed frame against the exterior panel of the truck and the clamp leg against the interior panel. Therefore, the material carrier is easily mounted on the truck and easily removed therefrom without any modification to the truck.

Another example is disclosed in a U.S. Pat. No. 4,864, 939, entitled "Work table assembly mountable on a panel transporting vehicle" ("the '939 Patent"). The '939 Patent discloses a work table assembly that is mountable on a vehicle and that is used for supporting a flat panel or the like thereon during work operations on the panel at an installation site, the work table assembly including a frame construction that is mountable on the vehicle and spaced outwardly therefrom, the table member being mounted for pivotal movement on the frame construction and being pivotally movable relative thereto from an upper vertically disposed transport position to a lower horizontal work position, at which work position a panel is received in supporting relation for a work operation thereon.

Another example is disclosed in a PCT Publication 2009108982, entitled "Device for transporting panel or board-shaped objects" ("the '982 Publication"). The '982 Publication discloses a pivoting flap provided on the upper edge of the basic frame of devices for transporting panel or board-shaped objects, said devices comprising clamping bars, which can be fixed on the frame of the device and in the effective positions thereof engage in recesses at the upper and lower edges of the frame. The pivoting flap in the effective position thereof prevents the removal of the clamping bars by lifting. The flap is coupled to locking devices via braces. The locking devices are operatively connected to an inclination sensor, which only releases the locking devices if the loading angle does not drop below the specified loading angle of in particular 6° relative to the perpendicular. As a result, the flap can only be opened and the clamping bars removed if the loading angle does not drop below the specified loading angle, which prevents the panel or board-shaped objects from falling out of the device.

Another example is disclosed in a German Publication No. 202011000766, entitled "Transport frame for glass panes and transport vehicle with the same" ("the '766 Publication"). The '766 Publication discloses a transport frame for glass panes, for flatbed transport vehicles with a flatbed of a predetermined length, with a frame for receiving glass panes and a frame holder which can be fastened to the transport vehicle for receiving the frame and which has pivot bearings so that the frame can be pivoted optionally into a transport position and a loading and unloading position, characterized in that the frame holder is formed by two vertical support profiles which, viewed in the longitudinal direction of the vehicle, are arranged at a distance which is greater than the predetermined length of the flatbed, so that the support profiles, viewed in the longitudinal direction of the vehicle, can be fastened to the transport vehicle in front of and behind the frame.

In addition, installation of large porcelain slabs poses another challenge, particularly in confined spaces such as showers. Typically, the large porcelain slabs are manually transported to the confined spaces and adhered to the walls. However, the current installation techniques recommended in the American National Standards Institute (ANSI) standards require much more time to do than working with, for instance, acrylic materials. Not adhering porcelain walls correctly to the walls could result in porcelain breakage, or other problems such as leakage in the shower.

As specified above, porcelain is a very hard and brittle material. As such, it is difficult to install the porcelain slabs with the current methods employed in the surfacing industry. American National Standards Institute (ANSI) standards 108.19 require that the substrates that porcelain attaches to are very flat, permitting only ⅛" in a 10' span. This requirement is far more stringent than the framing guidelines in the construction industry. This, along with natural wood variations result in studs being positioned offset to each other by up to half an inch. In other words, the front face of one stud may protrude even half an inch more than another one in the same wall. Therefore, before porcelain slabs can be attached to that wall, significant and time-consuming work needs to be done to "prepare" the surface such that it is flat and plumb.

To attain the required flatness and plumbness in the substrate, much work is currently required to add "shims" to existing studs, as needed. Then a substrate material, such as tile backer board, is attached over such shims. This process of "preparing" a wall can take several hours to do for just one bathroom.

ANSI standards 108.19 prescribe that there must be at least 80 percent coverage of adhesive material between the porcelain and the substrate in order to prevent future cracking.

Even when the above-mentioned shimming process is followed, the resulting substrate will still have peaks and valleys. Therefore, to achieve the 80 percent coverage required by the ANSI standard for the proper adherence of porcelain slabs the use of a thick layer of polymer-modified mortar thin set is recommended. However, applying such a thin set is a process that is time consuming. Furthermore, it is also a messy process which requires additional time both before the application, and after it for cleaning.

The "one-day shower remodel" market in the United States involves executing a total shower replacement in typically one 8-hour day. This includes: demolition of existing shower down to the studs; removing the existing plumbing and fixtures; installing a new shower floor; installing all new plumbing and faucets; installing new walls and ceiling; and installing shower doors and/or handles and benches. Currently the one-day shower remodel business uses predominantly acrylic sheets for walls due to their relatively ease of cutting and adhering.

The process explained above for achieving the required flatness and plumbness for porcelain is not required for acrylic walls given that acrylic is flexible and non-brittle. Porcelain slabs are a much more desirable material than acrylic, but the current lengthy process for surface preparation explained above prevents porcelain slabs from being a viable replacement for acrylic when time is of the essence and total remodel is expected in 8 to 16 work hours.

An exemplary schematic diagram 100 of a prior art system for installing porcelain slabs to walls is shown in FIG. 2. Here, polyurethane-based insulating foam sealant 102 is used to achieve required flatness by adding shims 104 of various thicknesses throughout the front surface of studs 106. Further, a substrate panel 108 is attached to studs 106. Furthermore, a set mortar 110 is applied to both the substrate panel 108 and a porcelain panel 112. Subsequently, porcelain panel 112 is attached to a wall following prescribed vibration process 114 to achieve the desired bond.

Several methods for mounting panels such as porcelain slabs have been disclosed in the past. One such example is disclosed in a U.S. Pat. No. 5,542,218, entitled "Structural support frame for ceramic tile corner seats and service trays" ("the '218 Patent"). The '218 Patent discloses a corrosion-resistant self-supported frame of a pre-formed shape, to which a mortar substrate and ceramic tile is applied, in order to produce corner seats and trays. The base unit connects to vertical surfaces by fasteners through mounting holes. A mortar support flange provides the shape of bonding surfaces for ceramic tile as well as support for the applied substrate. The substrate is reinforced by mortar penetration holes, allowing monolithic connection of all substrate materials. A drain hole allows for the elimination of moisture from the base unit.

Additionally, several systems and methods for installing shelfs have been disclosed in the past. One such example is disclosed in a U.S. Publication No. 20080224004, entitled "Shelf mounting system" ("the '004 Publication"). The '004 Publication discloses a shelf mounting system for mounting a shelf to a corner wall surface comprising an elongate member having a first arm and a second arm, each of the first arm and the second arm having a wall attachment portion and a body portion perpendicular to the wall attachment portion, the elongate member including a cut groove that extends along a width of the body portion to define an interruption between the first arm and the second arm, the body portion including a threaded region that extends at least partially along the length of the first arm and the second arm and a shelf member having a first abutment surface configured to abut the first wall surface and a second abutment surface configured to abut the second wall surface, the first and second abutment surfaces having a cut out portion for receiving the threaded region of the body portion.

Considering the above, there is a need in the art to provide a unique portable porcelain slab cutting table for cutting, and/or a transport attachment that can be used as on-site cutting table, and unique methods to install porcelain slabs on walls and/or as shelves that, together, allow for a total shower remodel in one to two working days.

SUMMARY OF THE INVENTION

It is an object of the present invention to provide a unique system that enables the "one-day bathroom remodel market" to be able to cut porcelain slabs at shop floor or at the on-site and be able to install the porcelain slabs within 8 to 16 work hours.

It is an object of the present invention to provide a complete system that permits preparation and rapid installation of porcelain slabs or wall coverings for bathrooms and similar uses.

It is another object of the present invention to provide unique portable porcelain slab cutting table for cutting that overcomes the prior deficiencies in a new and novel way.

It is another object of the present invention to provide a mobile porcelain slab cutting table attached to a porcelain slab transport vehicle, which can be deployed at a field for cutting large porcelain slabs.

It is another object of the present invention to provide a unique method to install porcelain slabs on walls, both wet (as in showers) and dry (as in fireplace surrounds and other walls) in about the same amount of time as currently required for acrylic walls.

It is yet another object of the present invention to provide a unique method to install a porcelain shelf to a wall that ensures no water leakage behind the substrate.

In order to achieve one or more objects, the present invention provides a complete system that permits the preparation and rapid installation of porcelain slabs or wall coverings for bathrooms and similar uses. The system includes a porcelain slab cutting table for cutting large porcelain slabs; a transport attachment that can be used for transporting porcelain slab and also as a cutting table whenever required (mobile porcelain cutting table attachment to the transport vehicle or glass carrier); a system/process for attaching porcelain slabs to walls; and a porcelain shelf attaching method.

This size of typical large format porcelain slabs is 126 inches by 63 inches. This is far larger than the typical size of a wall in the "one-day" bath market, which rarely exceeds 96 inches in height. For simplicity of transportation, handling, and cutting at the job-site there exists a need to effectively cut down a full slab to the approximate size at a location such as a warehouse, before loading slabs onto transport vehicles.

A full-size large format porcelain slab with a thickness of 6 mm. weighs about 150 pounds, which means that it can be effectively carried by two people, rather than requiring a crane. However, given porcelain's brittleness such slab must be carried in a vertical position as switching to an unsupported horizontal position would make the porcelain slab crack. Cutting it, however, must be done in a horizontal position. Therefore, there exists a need to safely translate a slab from a vertical position to a horizontal one. The shop porcelain cutting table in this invention permits the safe loading of slabs onto it by two humans without the need of a crane.

In one aspect, the porcelain slab cutting table has a continuous metal component presenting a top frame for receiving large porcelain slabs. The porcelain slab cutting table has a base frame connecting the top frame. The base frame presents upstanding poles that extend from the base frame and connect the top frame. Further, the base frame has wheels allowing the porcelain slab cutting table to be transported easily within a warehouse or shop floor.

The top frame has a plurality of loading assemblies. Each of these assemblies is coated with a layer of Polytetrafluoroethylene (PTFE) which significantly reduces the friction between the table and a porcelain slab, which then allows a slab to be easily moved around the table without unnecessary stress on either the table or the porcelain. One side of the top frame includes a plurality of rollers. The rollers serve to support the middle of the porcelain slab as it is flipped from a vertical position on the floor to a horizontal position on the top frame. The base frame has a provision for storing tools required for scoring or cutting the large porcelain slabs. In one example, the tools include a scoring tool having a scoring wheel. The scoring tool is used to score or scribe on the porcelain slab when it is placed horizontally on the top frame.

The porcelain slab cutting table construction and size permits use of continuous metal components rather than discontinuous beams with an associated seam and does not require further adjustments. Set up of the porcelain slab cutting table takes only seconds compared to the time currently required to join and calibrate two discontinuous table halves.

In another aspect, the invention provides a porcelain slab cutting table that utilizes a flat, continuous cutting surface and acts as an attachment (transport attachment) to a porcelain slab transportation system/transport vehicle/glass carrier. The transport attachment consists of a table that is attached to outer bars or attachment frames of existing glass carriers/transport vehicles. The transport attachment is designed to be used as a transport vehicle for safe transportation of large porcelain slabs and as a base for the large porcelain slab cutting table. The transport attachment is configured to be operated between a stowed configuration and a deployed configuration.

During transportation, the mobile porcelain slab cutting table/transport attachment is stored in its upright position/stowed configuration. Once the transport vehicle is parked at the job site/field/on-site, the transport attachment is pivoted to a horizontal position/deployed configuration, with one end being connected to the transport vehicle, which gives the table much rigidity when in a deployed mode. The free end of the transport attachment is used as the porcelain slab cutting table. In one example, the free end of the transport attachment is supported by foldable telescoping legs. The legs extend when the transport attachment is used as the porcelain slab cutting table. Further, the legs fold when the transport attachment is in the stowed configuration. The foldable telescoping legs provide a convenient storage means during transportation and once the transport attachment is rotated into the deployed position, the legs are rotated and locked into vertical, operating positing using a locking hinge, pin or any other convenient locking means.

In one implementation, the legs include locking pins to restrain the legs during transportation and, when rotated into the deployed configuration (and if necessary), are released to let the legs contact the arbitrary height terrain surface thus providing adjustability of support leg length to adjust to unknown terrain height and provide table surface support.

The transport attachment construction and size permits use of continuous metal components rather than discontinuous beams with an associated seam and does not require further adjustments. Set up of the transport attachment takes only seconds compared to the time currently required to join and calibrate two discontinuous table halves. The design of the transport attachment also allows for the transport vehicle to be used to transport porcelain slabs. When desired, a single porcelain slab can be removed from the transport vehicle (from the stack of porcelain slabs contained on the transport rack), placed on the cutting table/transport attachment, scored, and cut. The cut pieces can be removed, and the next slab is placed into position for the next cutting thus eliminating time consuming removal and placement of large porcelain slabs during the on-site cutting process. The top surface of the transport attachment is coated with a layer of Polytetrafluoroethylene (PTFE) which significantly reduces the friction between the table and a porcelain slab, which then allows a slab to be easily moved around the table without unnecessary stress on either the table or the porcelain.

Additionally, in the event that there is no room for a transport attachment next to the transport vehicle, or the table/transport attachment needs to be used at a location separate from the transport vehicle, a second set of deployable legs may be placed on the edge of the transport attachment near a glass rack in a similar fashion as the outer edge legs of the transport attachment. After placement of the additional set of legs, the transport attachment can be removed from the transport vehicle by disconnecting the attachment frame.

The transport attachment enables fast and reliable on-site cutting of large porcelain slabs while drastically reducing the risk of cracking the porcelain slabs.

In another aspect, the present invention provides a process and/or system for expediently attaching porcelain slabs to walls. According to the teachings of the present invention, a porcelain (or other brittle materials, e.g., glass) process that includes: attaching substrate panels to uneven studs; and attaching large format porcelain slabs (GPTP) to the substrate panels are disclosed. The process allows the porcelain panels to be attached to the walls with the flatness, plumbness and coverage required by the ANSI standards, but in considerably less time than the process currently employed in the industry.

In yet another aspect, the present invention provides a method for attaching a porcelain shelf to a wall in a waterproof way. The porcelain shelf system includes a metal flashing barrier, a waterproof core board that is mounted to the wall using screws, and a porcelain shelf that is glued to the core board. In order to add a porcelain shelf to the core board, the porcelain slab is cut to size and glued to create a shelf with a "U" shape cross section to fit over the core board such that the core board gets concealed completely while exposing only the porcelain surfaces. The porcelain shelf includes a waterproof stainless steel flashing that sits between the core board and the studs to prevent moisture penetration into interior construction.

In one advantageous feature of the present invention, the system allows an installer to complete a full installation within 8 to 16 working hours by integrating cutting and total shower remodel from demolition to finished product using porcelain slabs, achieving significant time and cost savings. The system presents a porcelain slab cutting table that allows to cut large porcelain slabs at shop floor and the like. The system presents a mobile porcelain slab cutting table that allows to transport the porcelain slabs and cut the porcelain slabs at the on-site or field. After reaching the on-site, the porcelain slabs are attached to the wall. Optionally, the porcelain slab is installed as a shelf extending from the wall.

In one advantageous feature of the present invention, the system provides a series of novel cutting tables and installation systems that integrate cutting and other functions in order to achieve total shower remodel from demolition to finished product using porcelain slabs within 8 to 16 working hours.

These and other objects of the present invention will be apparent from review of the following specification and the accompanying drawings.

10

Figure 18:
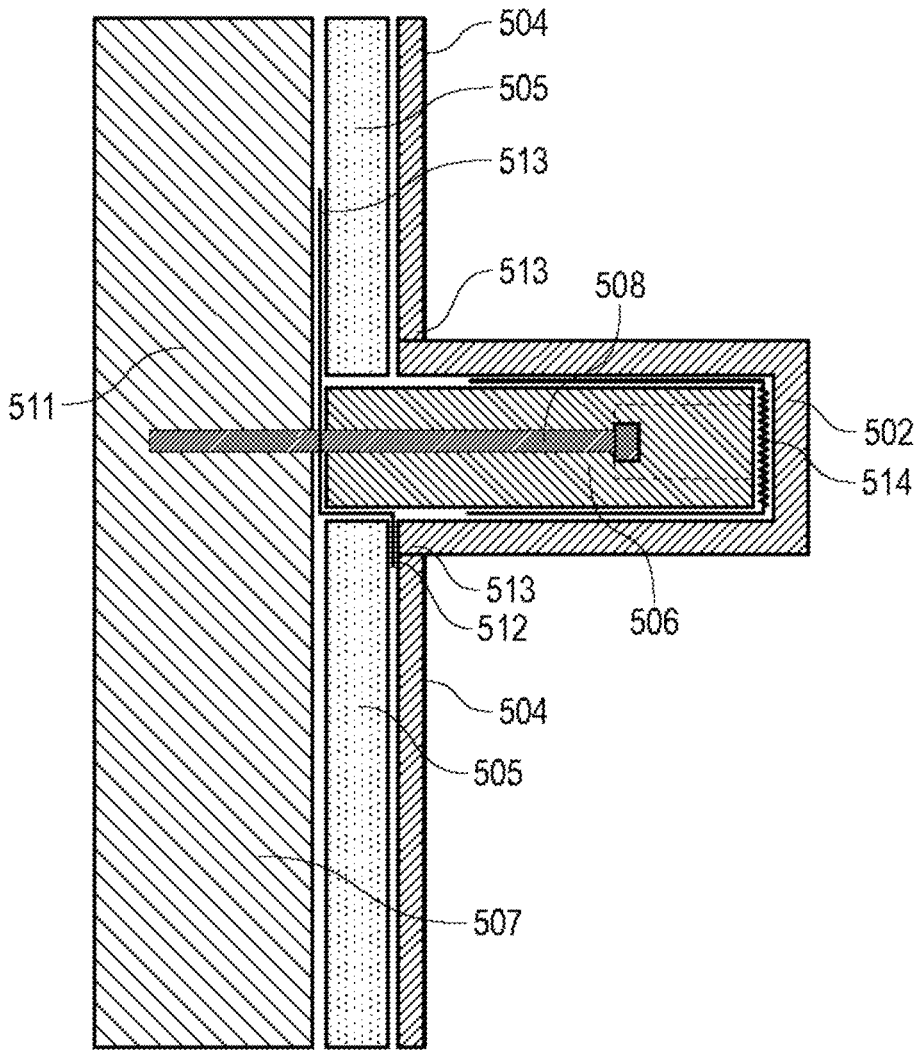

FIG. 18 shows a schematic cross-sectional diagrams of the porcelain shelf, in accordance with one embodiment of the present invention.

DETAILED DESCRIPTION OF THE PREFERRED EMBODIMENT

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed system for cutting and installing the porcelain slabs. However, it will be apparent to those skilled in the art that the presently disclosed invention may be practiced without these specific details. In some instances, well-known structures and devices are shown in functional or conceptual diagram form in order to avoid obscuring the concepts of the presently disclosed system for cutting and installing the porcelain slabs.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes system for cutting and installing the porcelain slabs, it is to be further understood that numerous changes may arise in the details of the embodiments of the system for cutting and installing the porcelain slabs. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

Various features and embodiments of a system for cutting and installing the porcelain slabs are explained in conjunction with the description of FIGS. 3-18.

Figure 1:
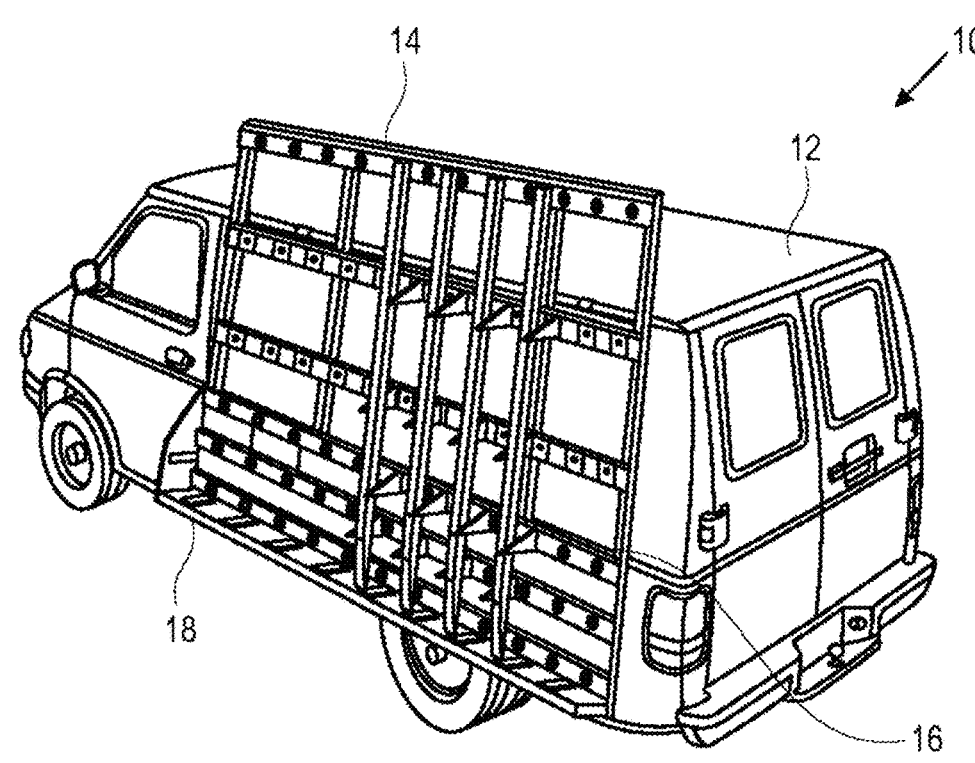
FIG. 1 is an environment of a transport vehicle having a transport attachment, in accordance with prior art.
Figure 2:
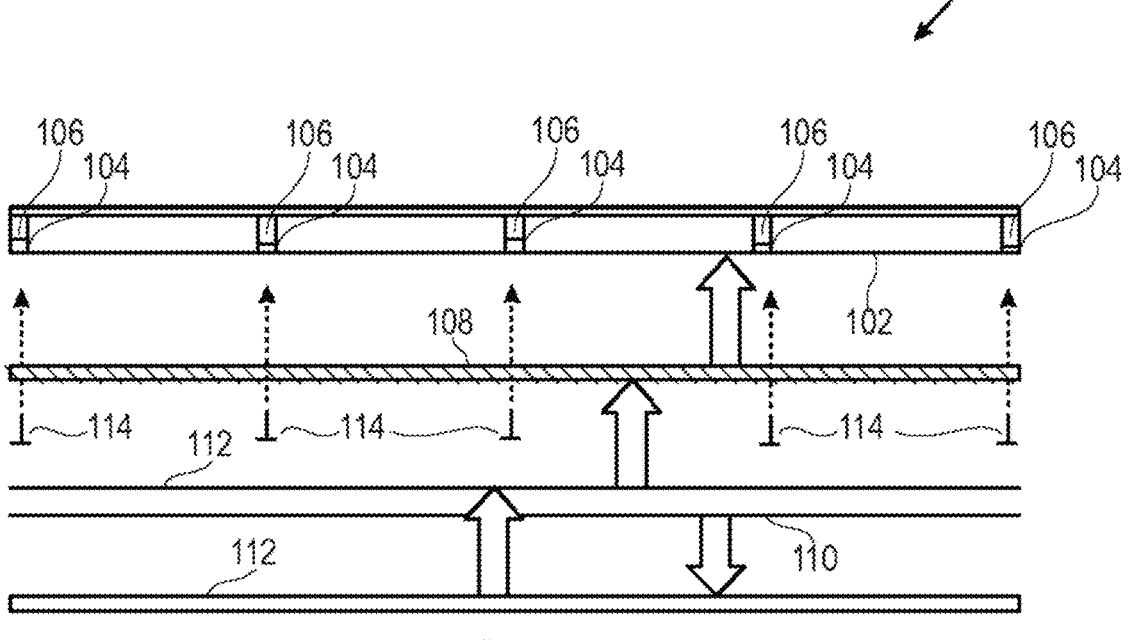
FIG. 2 is a schematic diagram for installing porcelain slabs to walls, in accordance with prior art.
Figure 3:
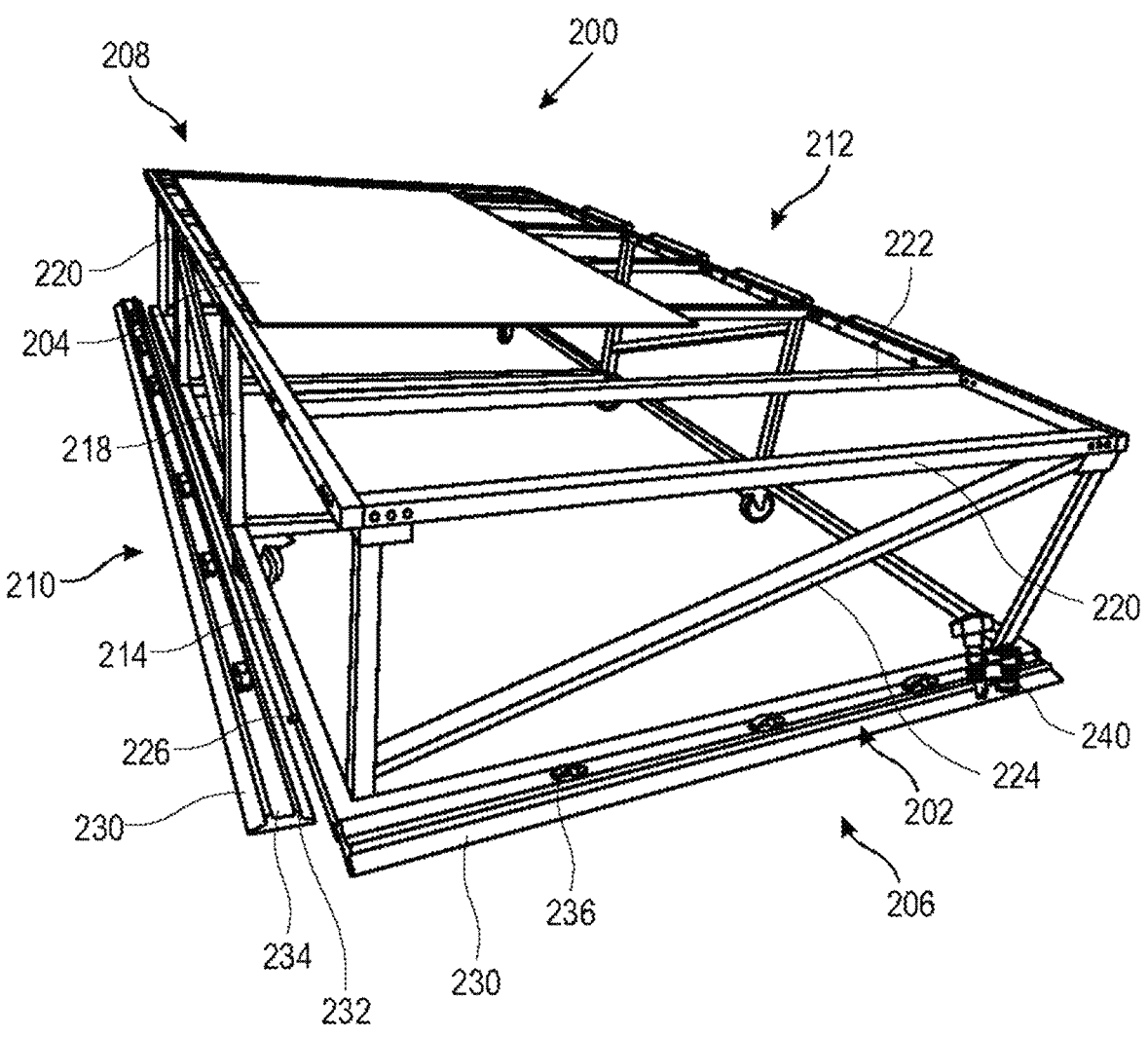
FIG. 3 is an environment of a porcelain slab cutting table used for cutting a porcelain slab, in accordance with one embodiment of the present invention.
Figure 4:
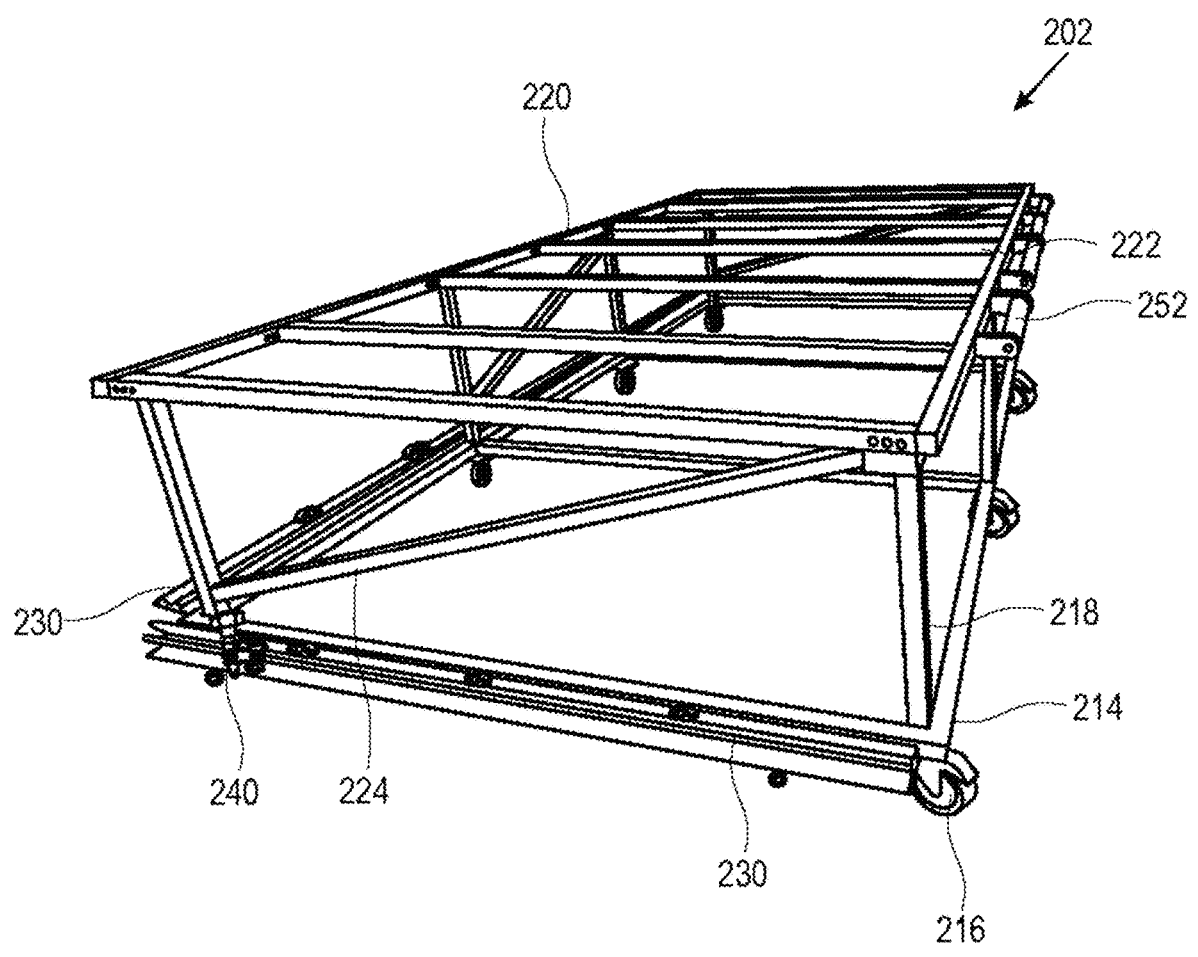
FIG. 4 and FIG. 5 illustrate a first side perspective view, and a second side perspective view, respectively of the porcelain slab cutting table, in accordance with one embodiment of the present invention.
Figure 5:
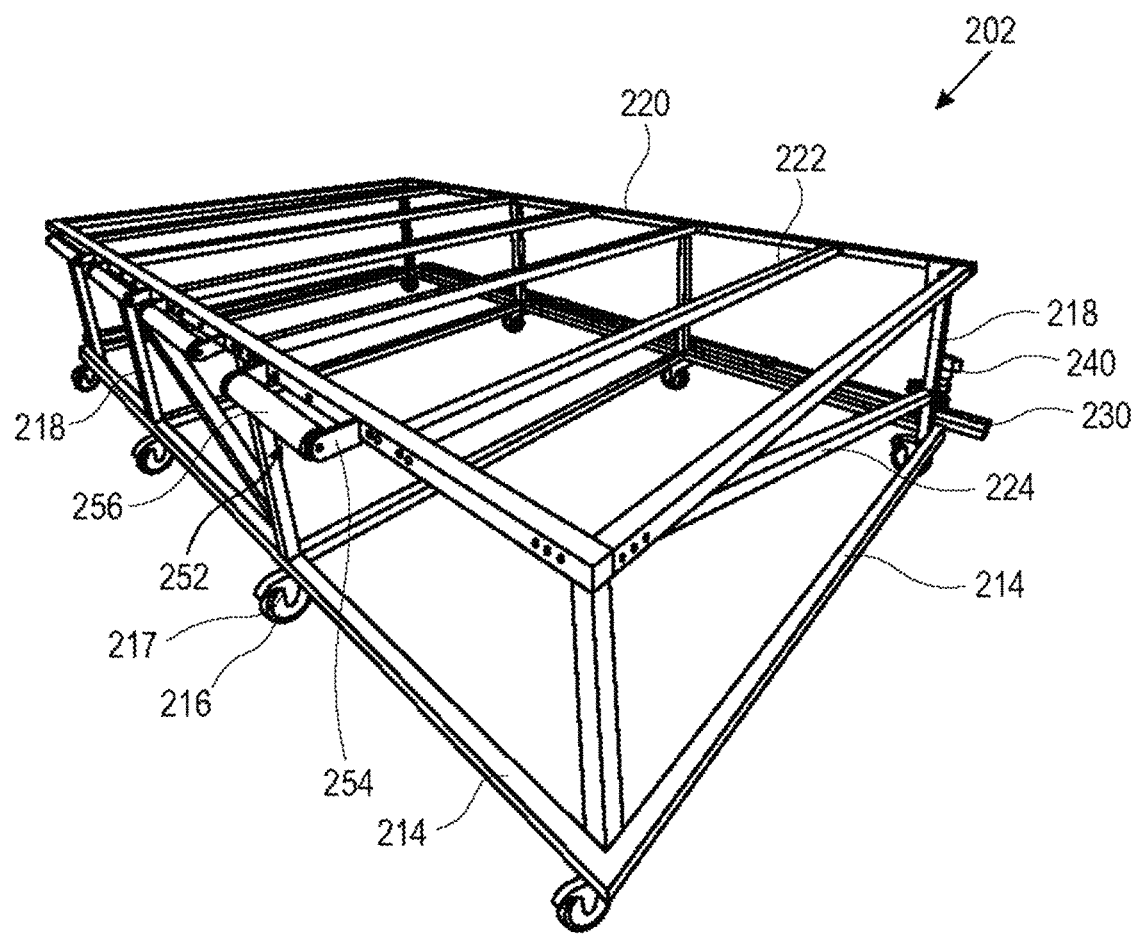

The system provides a series of novel cutting tables and installation systems that integrate cutting and other functions in order to achieve the full remodel of bathroom wet area, which includes the shower and tub, from demolition to finished product using porcelain slabs within 8-16 working hours. FIG. 3 shows an environment 200 in which a porcelain slab cutting table or shop table 202 used for cutting a porcelain slab 204 implements, in accordance with one embodiment of the present invention. For ease of reference, porcelain slab cutting table 202 is referred as "table" 202 hereinafter. Porcelain slab cutting table 202 is used to cut large porcelain slabs in a shop floor or warehouse before they can be transported to on-site or field for detailed cutting and installation. Now referring to FIG. 4 and FIG. 5, a first side perspective view, and a second side perspective view, respectively of table 202 are shown, in accordance with one embodiment of the present invention. Table 202 presents a first side 206, a second side 208, a third side 210, and a fourth side 212. First side 206 indicates a front side, and second side 208 indicates a rear side, or vice versa of table 202. Third side 210 indicates a right side and fourth side 212 indicates a left side, or vice versa of table 202. A person skilled in the art understands that sides 206, 208, 210, 212 are used for reference purposes only.

Table 202 encompasses a base frame 214. Base frame 214 comes in a square or rectangular configuration depending on the need. Base frame 214 is made of metal or any suitable material that can withstand the weight of porcelain slab 204 and/or tools (not shown) used for cutting porcelain slab 204. Base frame 214 is formed by joining multiple metal sections that when joined together, form a single, flat and continuous component. Base frame 214 rests over a surface such as a floor via wheels 216, each wheel including a foot-actuated brake. In one example, a total of 6 to 10 wheels 216 are provided at the base frame 214. Wheels 216 include casters 217 for supporting base frame 214 to rest over wheels 216. Wheels 216 help to transport large porcelain slabs 204, each weighing about 100-200 lbs. (pounds). Further, wheels 216 help to move table 202 closer to porcelain slabs 204 before they can be loaded onto table 202.

Further, base frame 214 presents upstanding poles 218. Upstanding poles 218 extend upward from base frame 214. Upstanding poles 218 receive a top frame 220. Top frame 220 comes in a square or rectangular configuration and rests over upstanding poles 218. Top frame 220 is formed by joining multiple metal sections that when joined together, form a single, flat and continuous component. Each of upstanding poles 218 and top frame 220 are made of metal or any suitable material that can withstand the weight of porcelain slab 204 and/or tools (not shown) used for cutting porcelain slab 204.

In one implementation, top frame 220 encompasses a plurality of support bars 222. Support bars 222 position vertically and/or horizontally in flush within top frame 220. Support bars 222 allow to place a large piece of porcelain slab 204 or two porcelain slabs 204 that require cutting, as shown in FIG. 3, for example. Further, table 202 encompasses cross-bars 224. A cross-bar 224 indicates a supporting rod that extends from upstanding pole 218 at an angle and connects top frame 220. In one example, cross-bars 224 extend from each or selective upstanding poles 218 and connect to top frame 220. Cross-bars 224 help to distribute the weight of porcelain slabs 204 across the entire structure of table 202. Alternatively, cross-bar 224 extends from the bottom of upstanding pole 218 and connects to a connecting point where adjacent upstanding pole 218 intersects top frame 220.

In one embodiment, each of base frame 214 and top frame 220 is formed as a continuous metal component rather than discontinuous beams. This allows each of base frame 214 and top frame 220 to be in an associated seam and avoid further adjustments. As each of them are formed out of a continuous metal component, setting up table 202 takes only seconds compared to the time currently required to join and calibrate two discontinuous table halves in the prior art.

Figure 6:
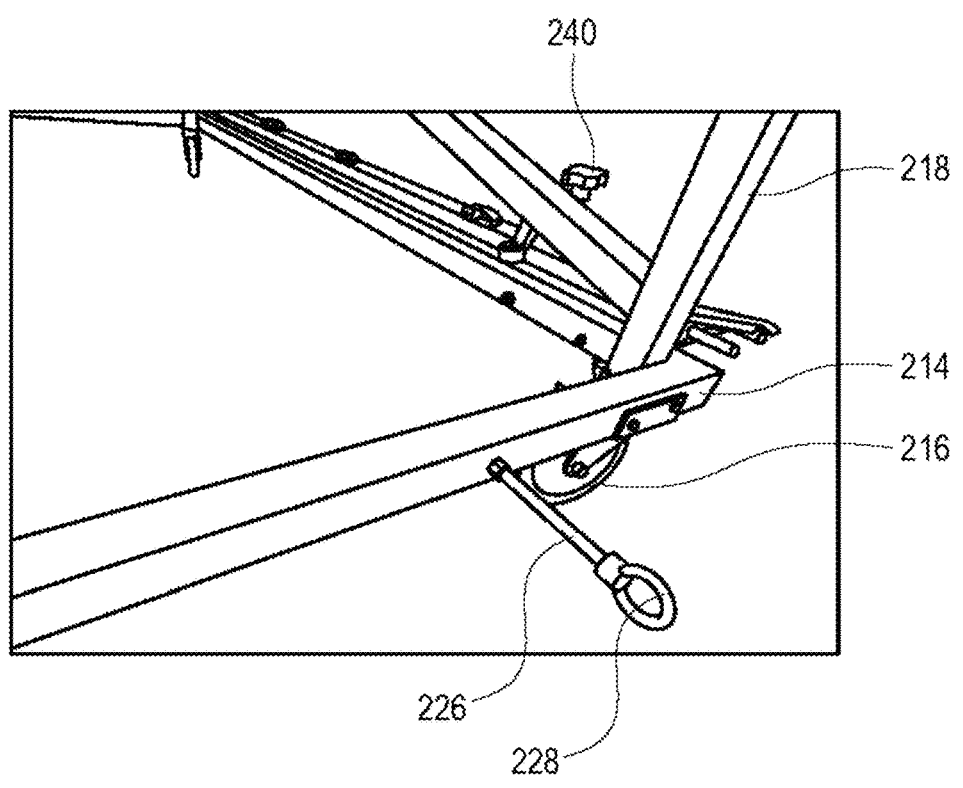
FIG. 6 is an enlarged view showing a hook extending from a base frame, in accordance with one embodiment of the present invention.

Table 202 encompasses a plurality of hooks 226. Hooks 226 extend away from base frame 214 at first side 206 and/or third side 210, as can be seen from FIG. 4 and FIG. 5. FIG. 6 shows the feature of hook 226 extending from base frame 214, in accordance with one embodiment of the present invention. In one embodiment, hooks 226 configure to removably receive an elongated rail 230 having a scoring tool 240. It should be understood that one or more rails 230 having scoring tools 240 can be provided at table 202. In one example, a longer elongated rail 230 is placed at first side 206. In another example, an additional shorter elongated rail 230 is placed at third side 210. Cutting rails and tools are commercially available by various manufacturers.

Figure 7:
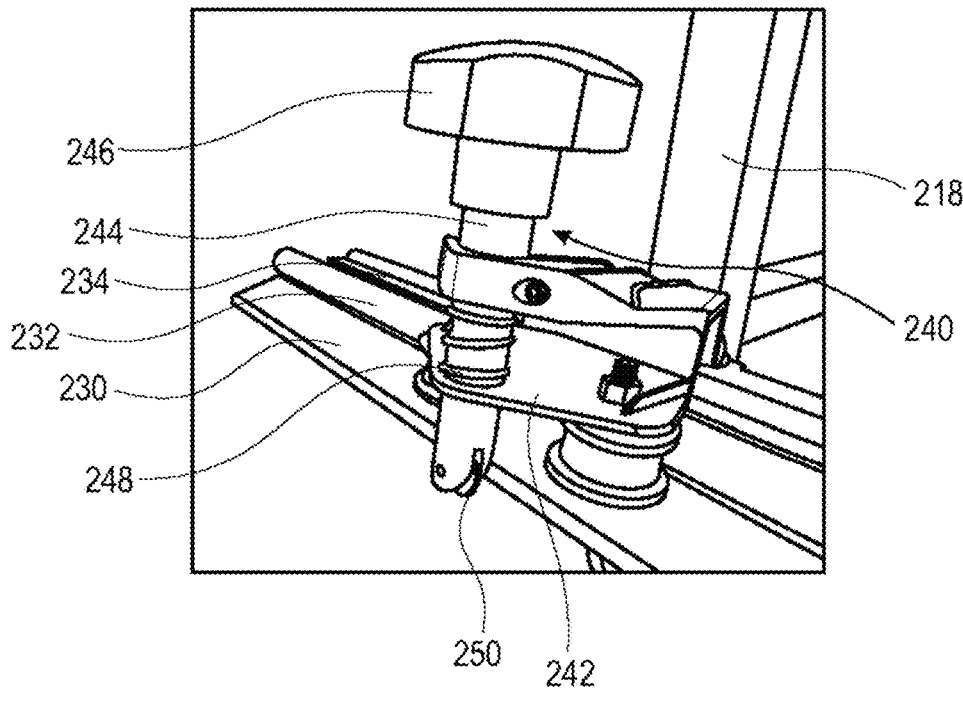
FIG. 7 is a perspective view of a scoring tool, in accordance with one embodiment of the present invention.

As specified above, rail 230 includes scoring tool 240. Scoring tool 240 may include any scoring tool as known in the art. FIG. 7 shows a perspective view of scoring tool 240 positioned at the bottom of table 202 i.e., at rail 230. Scoring tool 240 connects to rail 230 using any one of known mechanisms. Scoring tool 240 includes extending arms 242 that receive a rod 244. Rod 244 presents a head 246 at the top. Further, scoring tool 240 includes a spring member 248 positioned between arms 242. Rod 244 includes a diamond blade or scoring wheel 250 at the bottom end. Scoring wheel 250 comes in the form a rotatable wheel capable of scoring or scribing on porcelain slab 204. Here, scoring wheel 250 helps to score or scribe on porcelain slab 204 before porcelain slab 204 is snapped or cut. As known, porcelain slab 204 is an extremely dense and hard material, thus making it difficult to cut through in one pass. Scoring using scoring tool 240 creates a shallow groove or score line on a surface of porcelain slab 204 along a desired cut line. The shallow groove or score line acts as a predetermined breaking point that allows porcelain slab 204 to be snapped or cut cleanly along the shallow groove. In addition, the shallow groove prevents cracking and chipping away of porcelain slab 204 during the snapping or cutting process.

In one embodiment, hooks 226 extending from base frame 214 from one or more sides of table 202 present a convenient place for placing tools for snapping or cutting porcelain slab 204 when not in use. When needed, rail 230 having scoring tool 240 is placed on porcelain slab 204 (which is seated on top frame 222 and/or support bars 222) for scoring on porcelain slab 204.

Figure 8:
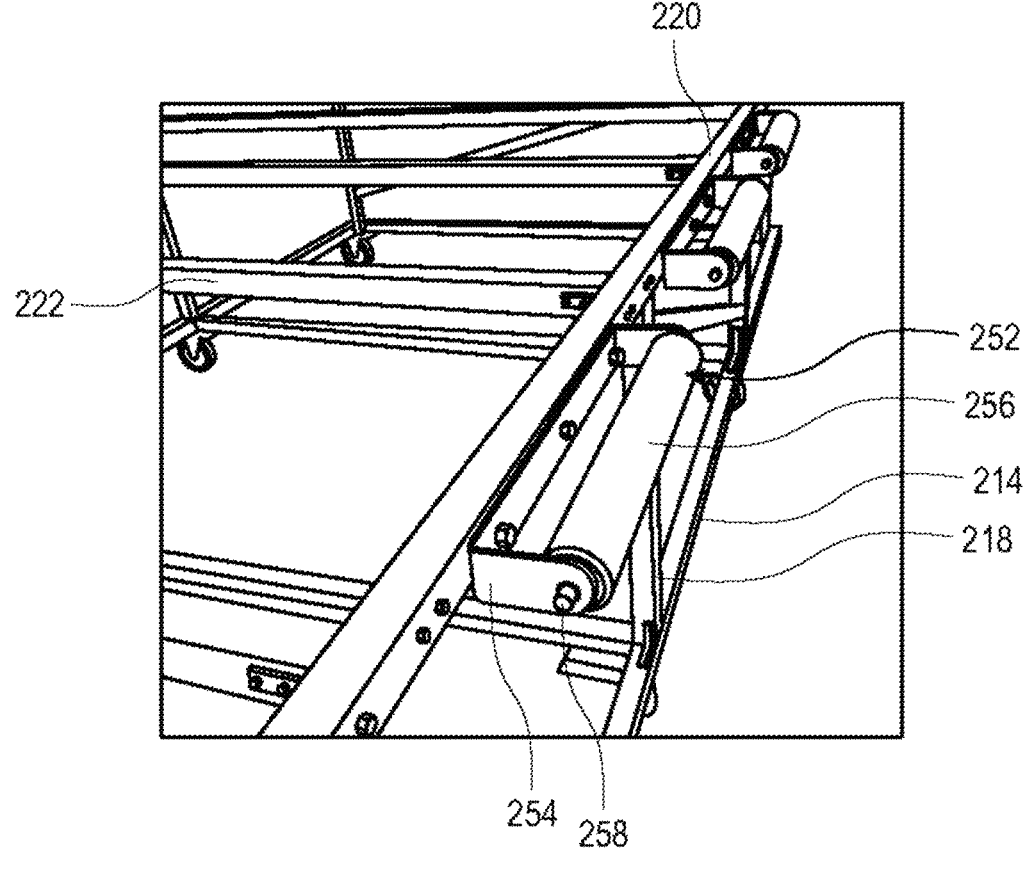
FIG. 8 illustrates loading assemblies having rollers, in accordance with one embodiment of the present invention.

As specified above, each large porcelain slab 204 may weigh about 100-200 lbs. (pounds). In order to load porcelain slab 204 onto top frame 222 and/or support bars 222 for scoring/cutting, table 202 is moved closer to porcelain slabs 204, where they are stored vertically. In order to load porcelain slabs 204 onto top frame 222, the present invention provides a plurality of loading assemblies 252 installed at fourth side 212, as can be seen from at least FIG. 4. FIG. 8 shows the feature of loading assemblies 252. Each loading assembly 252 includes a U-shaped frame 254. U-shaped frame 254 connects to top frame 220. As can be seen, U-shaped frame 254 extends away from top frame 220. U-shaped frame 254 receives a roller 256 via a connector 258. Roller 256 is configured to rotate when pressure is applied.

In accordance with the present invention, vertical porcelain slab 204 is placed adjacent to table 202. Subsequently, vertical porcelain slab 204 is made to lean against rollers 256 and subsequently porcelain slab 204 is tilted such that porcelain slab 204 flips and positions horizontally over top frame 220 and/or support bars 222, as shown in FIG. 3, for example. It should be understood that rollers 256 support as columns in the middle as porcelain slab 204 is flipped from vertical position on the floor to horizontal position on top frame 220 and/or support bars 222. Once porcelain slab 204 is placed in horizontal position on top frame 220 and/or support bars 222, the weight of porcelain slab 204 is transferred to top frame 220 and/or support bars 222.

Table 202 helps to transfer porcelain slab 204 from its vertical position to horizontal position on top frame 220 and/or support bars 222. Subsequently, table 202 helps to transport porcelain slab 204 from one place to another in a shop floor or warehouse easily with the help of wheels 216. Further, table 202 has a means i.e., hooks 226 for removably receiving rail 230 having scoring tool 240. Scoring tool 240 is used to score or scribe on porcelain slab 204 when porcelain slab 204 is placed horizontally on table 202. In one example, scoring tool 240 is used to cut porcelain slab 204 from its original size of typically 126 inches to something closer to what will be needed at the job site, typically 100 inches. Likewise, table 202 can be used to cut porcelain slab 204 vertically to reduce its width. After cutting, porcelain slab 204 is transported to field or on-site for detailed cutting, and subsequent installation. In one example, porcelain slab 204 is transported to the on-site using a specially designed transport vehicle.

The presently disclosed table 202 presents a single large table with flat and continuous top frame 220 and/or base frame 214 allowing to place large porcelain slab 204 measuring up to 130" in length, instead of putting together two tables, each measuring 60" to 72", as in the prior art. As table 202 presents a single flat and continuous surface for placing large format porcelain slab 204, there is no risk of table 202 being uneven and avoids cracks during the score-and-snap process.

Figure 9:
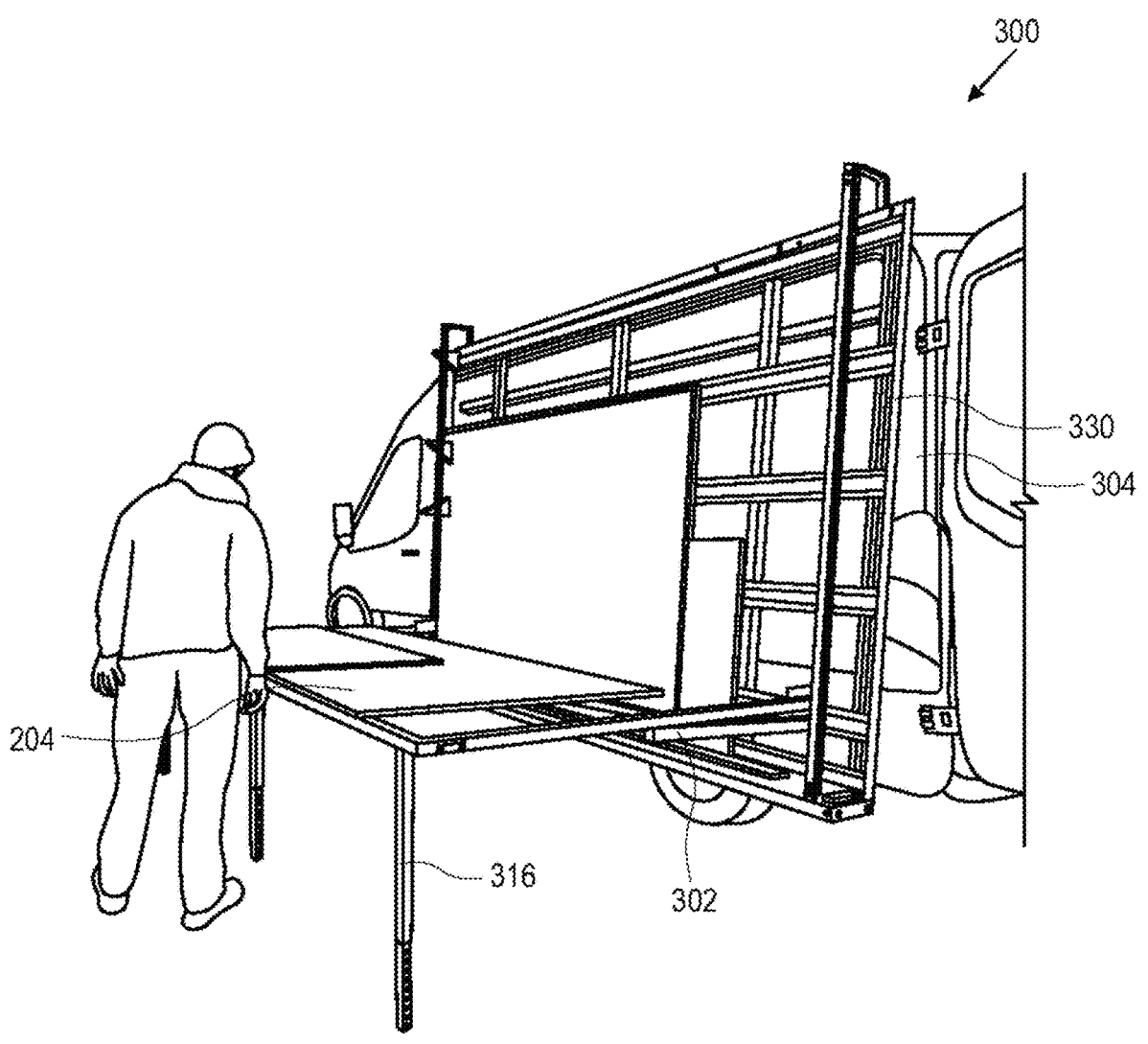
FIG. 9 is an environment in which a transport attachment or mobile porcelain slab cutting table implements, in accordance with one embodiment of the present invention.
Figure 10:
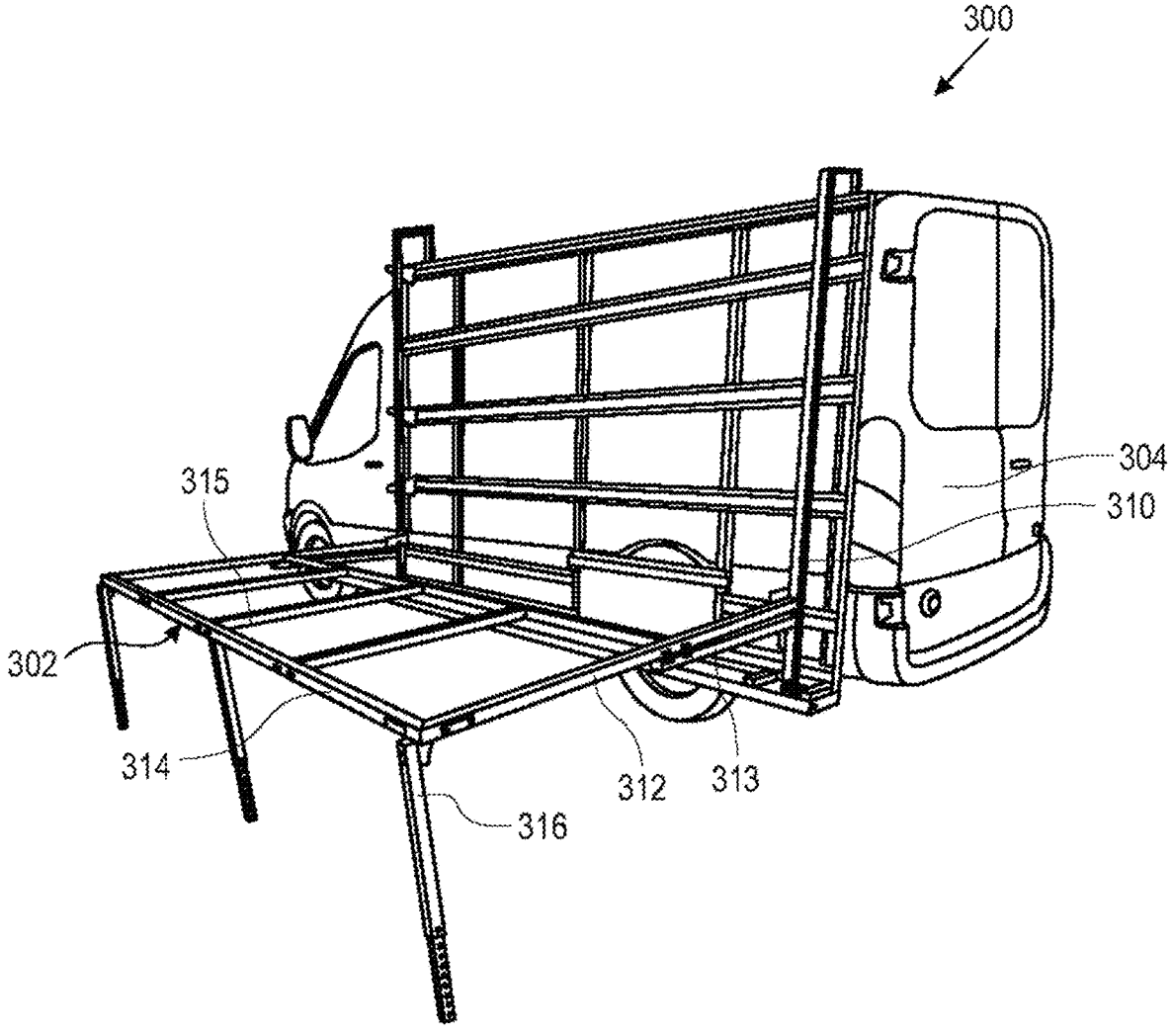
FIG. 10 is a perspective view of the transport attachment in a deployed configuration and connected to a transport vehicle, in accordance with one embodiment of the present invention.
Figure 11:
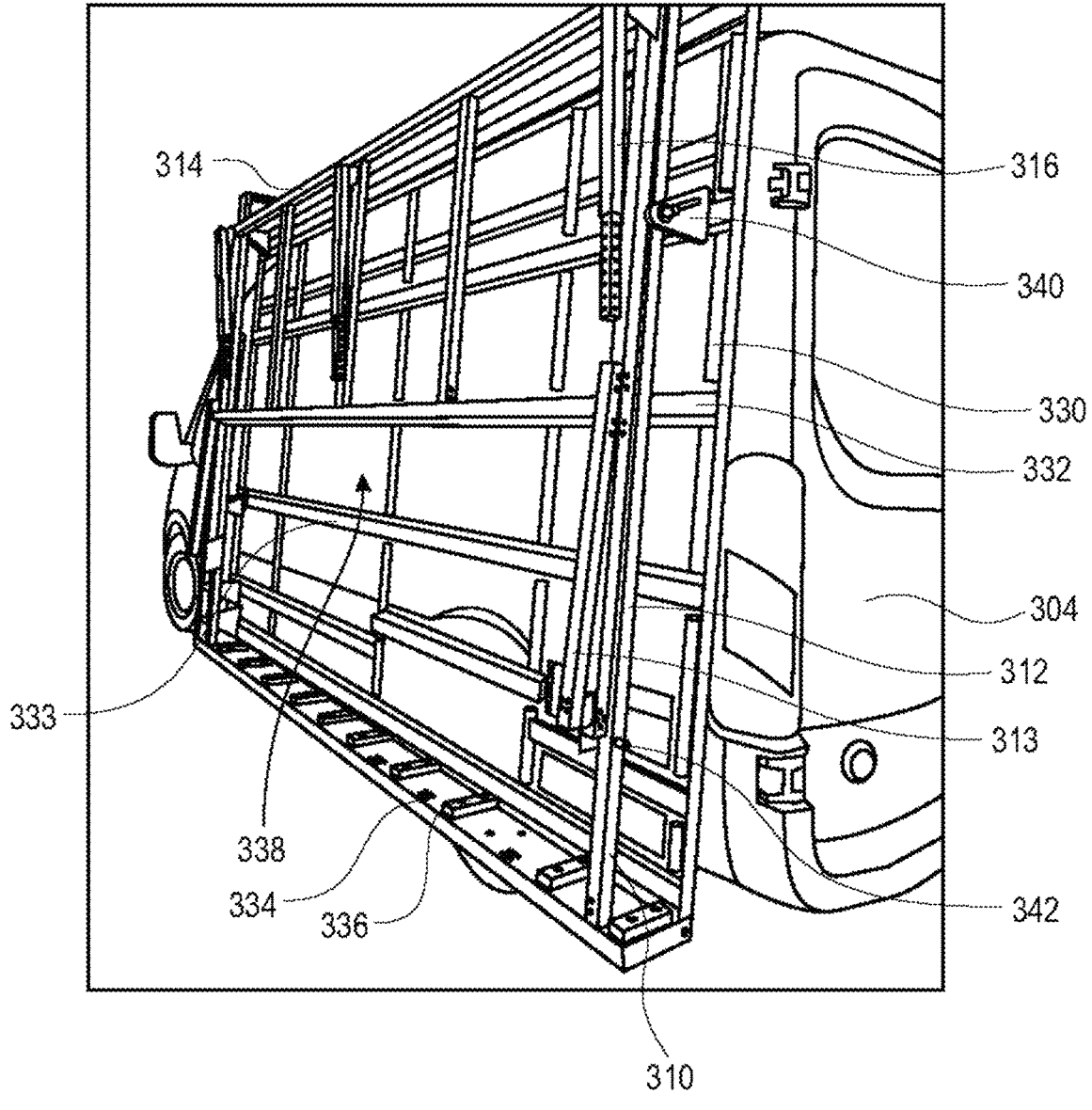
FIG. 11 is a perspective view of the transport attachment in a stowed configuration and connected to a transport vehicle, in accordance with one embodiment of the present invention.

Now referring to FIG. 9, an environment 300 in which a mobile cutting table 302 implements for transporting porcelain slab 204 to on-site, in accordance with one embodiment of the present invention. Mobile cutting table 302 refers to a mobile porcelain slab cutting table that is attached to a transport vehicle 304 that in turn has glass carrier or glass rack 330 attached to said transport vehicle 304 for transporting porcelain slab 204. In one exemplary implementation, porcelain slabs 204 cut using table 202 are transported to on-site using glass carrier 330. Optionally, mobile cutting table 302 is deployed at the on-site to cut porcelain slab 204 to desired size. Here, FIG. 10 shows a perspective view of mobile cutting table 302 in a deployed configuration and connected to glass rack 330 which in turn is attached to transport vehicle 304, in accordance with one embodiment of the present invention. Further, FIG. 11 shows a perspective view of mobile cutting table 302 in a stowed configuration and connected to glass rack 330, in accordance with one embodiment of the present invention. Furthermore, FIG. 12 shows a perspective view of mobile cutting table 302 in deployed configuration.

Figure 12:
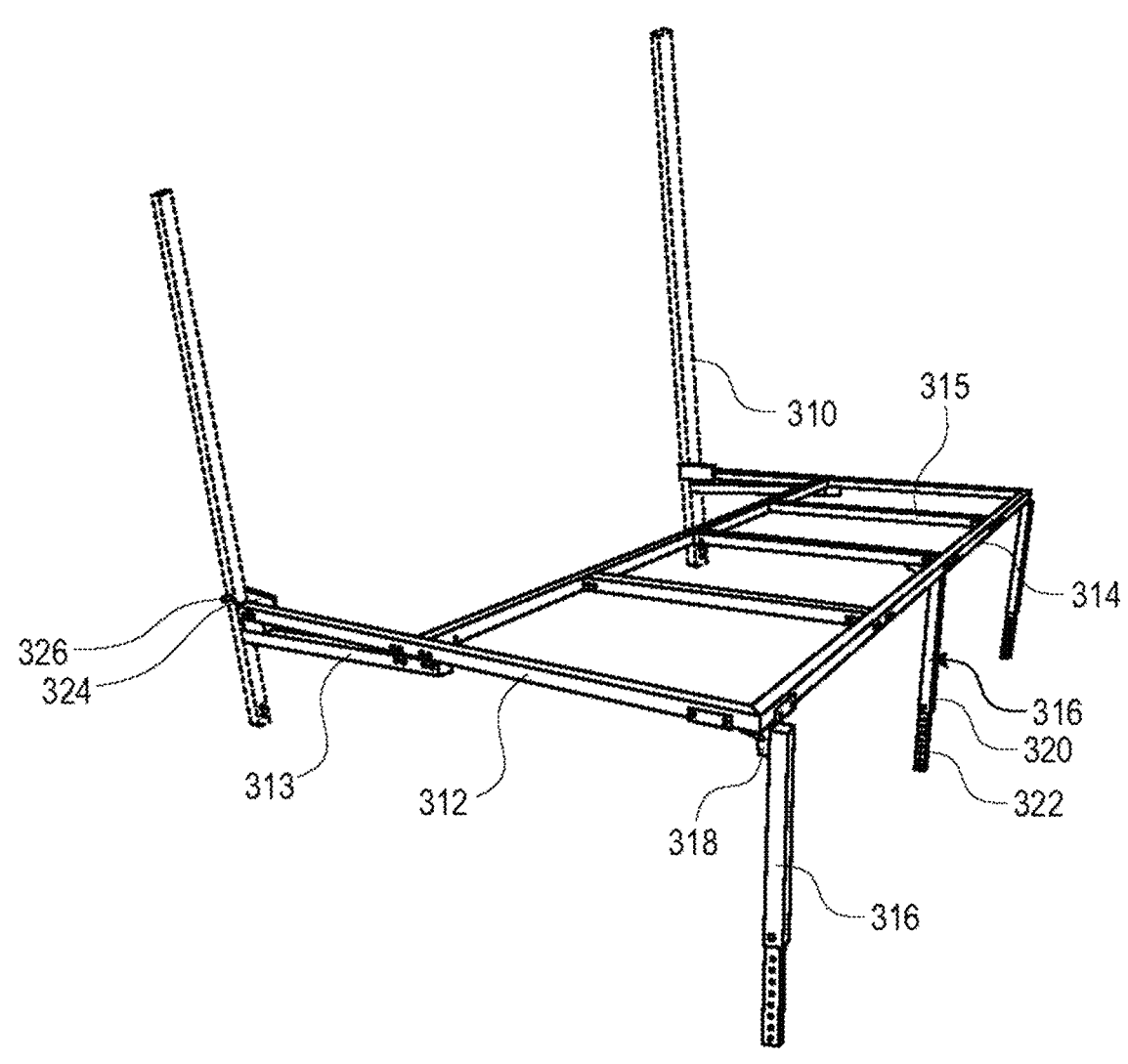
FIG. 12 is a perspective view of the transport attachment in the deployed configuration, in accordance with one embodiment of the present invention.

As can be seen from at least FIG. 12, mobile cutting table 302 connects to poles 310 that are part of typical glass racks. Poles 310 are made of metal or any other suitable material. In one example, mobile cutting table 302 connects to poles 310 that are part of typical glass rack 330. In a preferred embodiment, poles 310 come as an integral part of glass rack 330 and mobile cutting table 302 removably connects to poles 310. In the present embodiment, poles 310 encompasses first extending frames 312. First extending frames 312 extend from both ends of poles 310. First extending frames 312 connect hingedly to poles 310 via a connecting plate 324 using pins 326. Additionally, poles 310 encompasses support frames 313. Each support frame 313 extends from poles 310 and positions underneath first extending frame 312. In one example, support frame 313 extends half the length of first extending frame 312.

Further, mobile cutting table 302 includes second extending frames 314. Second extending frames 314 position perpendicularly to first extending frames 312. As can be seen, one second extending frame 314 connects both first extending frames 312 at their substantial half length, and another second extending frame 314 connects both first extending frames 312 at their distal ends. The position of second extending frame 314 is specifically designed to allow for a wide opening between the cutting table 302 and the vehicle which allows a person to work on that side of the table and also for slabs to easily rotate from a vertical position on glass rack 330 to be loaded onto cutting table 302. Further, second extending frames 314 include connecting frames 315. Connecting frames 315 connect between second extending frames 314 at same or varied distances from one another. In one example, connecting frames 315 position perpendicularly to second extending frames 314 and parallel to first extending frames 312. Optionally, connecting frames 315 position perpendicularly to first extending frames 312 and parallel to second extending frames 314. In the present embodiment, porcelain slab 204 sits above connecting frames 315 and/or first extending frames 312 and/or second extending frames 314, as shown in FIG. 9, for example.

Mobile cutting table 302 includes telescopic legs 316. Legs 316 hingedly connect to one of second extending frames 314. In one example, each leg 316 connects to second extending frame 314 via a hinge member 318. Hinge member 318 allows leg 316 to fold over and/or in alignment with first extending frames 312, as shown in FIG. 11, for example. In one implementation, legs 316 include a first leg member 320 and a second leg member 322. First leg member 320 is slightly wider than second leg member 322 and receives second leg member 322. Here, first leg member 320 connects second extending frame 314. Second leg member 322 extends and retracts into first leg member 320 and rests over the surface or ground. Here, second leg member 322 retracts into and extends from first leg member 320 to adjust the length of leg 316. In one example, second leg member 322 includes a base pad (not shown). The base pad contacts the surface/floor and prevents damage to the surface. The height of leg 316 defines the height at which vertical porcelain slab 204 needs to be placed above the ground. In order to ensure porcelain slab 204 remains flat/horizontally over connecting frames 315, and/or first extending frames 312 and/or second extending frames 314; the height at which connecting point i.e., connecting plate 324 and legs 316 position is adjusted.

In order to connect mobile cutting table 302, transport vehicle 304 is provided with glass rack 330. Glass rack 330 includes a side frame 332 that connects to transport vehicle 304 using known mechanisms. Side frame 332 presents a first cushion member 333. First cushion member 333 is made of soft material to prevent porcelain slab 204 from having scratches during transport. Glass rack 330 includes a base extending frame 334. Base extending frame 334 extends perpendicularly from side frame 332. Base extending frame 334 presents a plurality of second cushion members 336. Second cushion members 336 are made of soft material to prevent porcelain slab 204 from having scratches during transport. Base extending frame 334 and side frame 332 define a slab receiving area 338. Slab receiving area 338 indicates an area used for placing porcelain slabs 204 in vertical position during transport. In one example, side frame 330 is provided with locking members 340 at one or both sides. Locking members 340 are used to lock first extending frames 312 in parallel with side frame 332 to position mobile cutting table 302 in stowed configuration, as shown in FIG. 11.

As can be seen, poles 310 connect and extend upwards from base extending frame 334. Here, poles 310 position in parallel to side frame 332. In order to position mobile cutting table 302 in the stowed configuration, at first, legs 316 are folded as shown in FIG. 11. First extending frames 312 are lifted up such that first extending frames 312 come in parallel to side frame 332. At this point, table 302 is attached to poles 310 using commercially available locking pins (not shown). Friction wedges 340 are used to firmly secure the porcelain slabs 204 in place during transportation and a plurality of them are normally part of the glass racks. Once all slabs 204 are positioned on glass rack 330, a third pole 310 (not shown) including additional friction wedges is inserted into slots in the glass rack and said friction wedges are positioned against the slabs 204 to secure them in place. Locking pins 342 are used to attach table assembly 302 to poles 310.

Mobile cutting table 302 is used with glass rack 330 for transporting porcelain slabs 204. After reaching on-site/field (where porcelain slabs 204 need to be installed), locking pins between table 302 and glass rack 330 are disengaged to swing down first extending frames 312. Subsequently, legs 316 are extended to support first extending frames 312 and second extending frames 314 in horizontal position (deployed configuration), as shown in FIG. 10. In accordance with one embodiment, all friction wedges 340 are disengaged, third pole 310 is removed, and porcelain slab 204 is removed from glass rack 330 and placed on connecting frames 315 and/or first extending frames 312 and/or second extending frames 314. After placing, porcelain slab 204 is scored and cut depending on the size requirements. The cut pieces of porcelain slab 204 can be removed, and the next porcelain slab 204 is placed into position for the next cutting thus eliminating time consuming removal and placement of large porcelain slabs 204 during the on-site cutting process. A person skilled in the art understands that mobile cutting table 302 acts as a mobile porcelain slab cutting table in the deployed configuration and helps to cut porcelain slabs 204 to desired size at the on-site.

It is important to note that mobile cutting table 302 construction permits use of continuous metal components for first extending frames 312, and/or second extending frames 314 rather than discontinuous beams with an associated seam which provides a flat surface for scoring and snapping porcelain slabs 204 without breakage. Also, mobile cutting table 302 does not require further adjustments during setup. The setup of mobile cutting table 302 into the deployed configuration takes only seconds compared to the time currently required to join and calibrate two table halves.

In one alternate embodiment, in the event that there is no room for mobile cutting table 302 next to transport vehicle 304, or mobile cutting table 302 needs to be used at a location separate from transport vehicle 304, a second set of deployable legs 313 which are hingedly connected to the end of extending frames 312 may be deployed/leveled in a similar fashion as the outer legs 316 of mobile cutting table 302. After placement of the second set of legs 313, mobile cutting table 302 can be removed from transport vehicle 304 by disconnecting poles 310 from glass rack 330.

Tear down and stowage of mobile cutting table 302 is simply the reverse of the set-up operation and can be performed in seconds. The presently disclosed mobile porcelain slab cutting table enables fast and reliable on-site cutting of large porcelain slabs 204 while minimizing the risk of cracking porcelain slabs 204.

Figure 13:
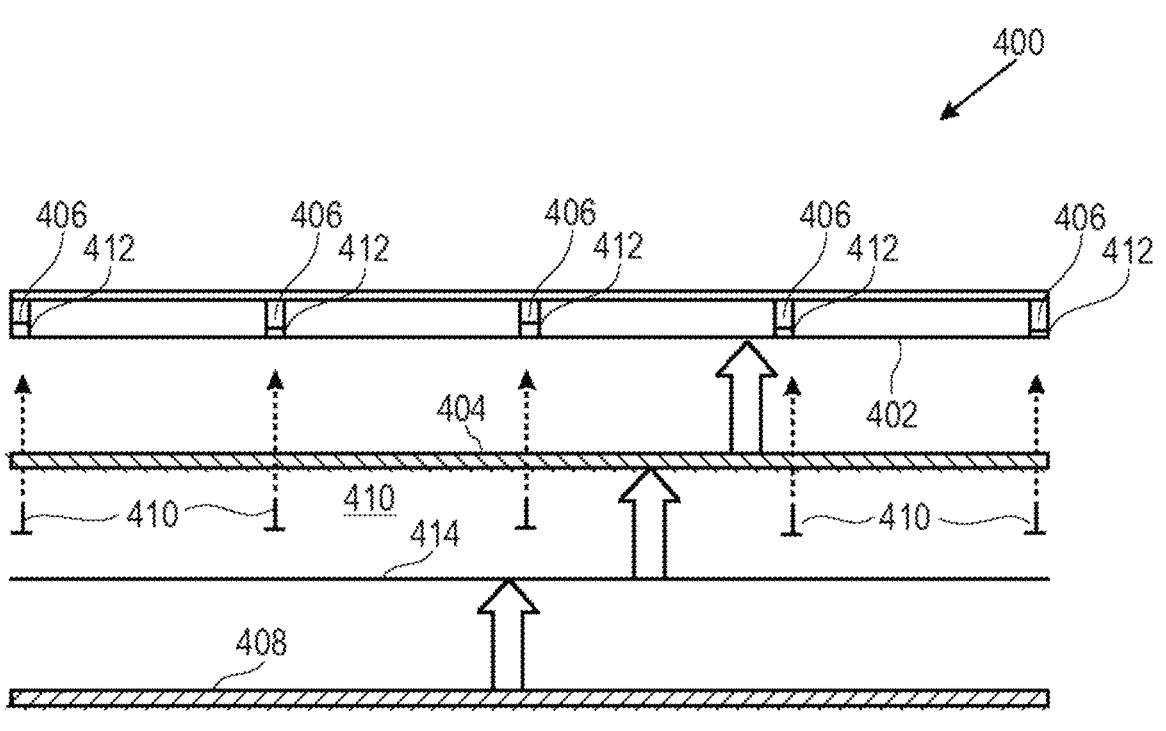
FIG. 13 is a schematic diagram for installing porcelain slabs to walls, in accordance with one embodiment of the present invention.

After reaching the on-site, porcelain slabs 204 are lifted/transported to install them at a bathroom and the like. In one embodiment, the present invention further discloses a process/system for attaching large porcelain slabs (GPTP) to substrate panels and/or attaching the substrate panels to uneven studs. FIG. 13 shows a schematic diagram 400 for achieving flatness as well as adhesive coverage required to efficiently and adequately install a porcelain panel or porcelain slab on walls in both wet (as in showers) and dry (as in fireplace surrounds and other walls) settings in about the same amount of time as currently required for acrylic walls.

In order to achieve required flatness 402, polyurethane-based insulating foam sealant 412 is added throughout the front surface of studs 406. Further, a substrate panel 404 is attached to studs 406. Furthermore, silicone or polymer-based adhesive 414 is applied to either substrate panel 404 or the porcelain panel or porcelain slab 408 using an applicator connected to a battery powered caulking gun that evenly spreads the adhesive to achieve the required coverage. Subsequently, porcelain panel 408 is attached and pressed onto the wall to achieve the desired bond.

Figure 14:
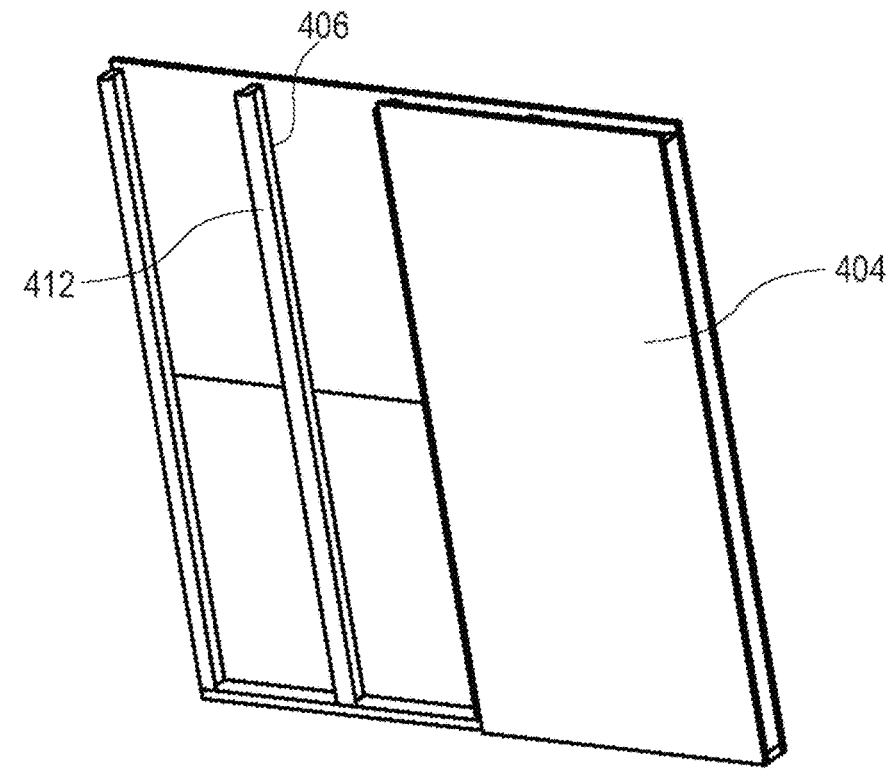
FIG. 14 is a perspective view of a substrate panel attaching to studs, in accordance with one embodiment of the present invention.

FIG. 14 shows a perspective view of substrate panel 404 attaching to studs 406 using polyurethane-based insulating foam sealant 412 to quickly and effectively fill up any voids between substrate panel 404 and studs 406 while positioning substrate panel 404 with the use of levels and squares such to achieve the required flatness and plumbness. In one example, screws (not shown) are used to provide additional strength.

In preparation, an installer cuts a waterproofed Polyiso Foam Board, such as Johns Manville's "GoBoard" to approximately the height and width required for a wall. Subsequently, the installer applies a solid line of commercially-available polyurethane-based insulating foam sealant 412, such as Loctite "Tite Foam Gaps & Cracks". Foam sealant 412 expands to approximately 1 inch diameter immediately upon leaving its canister and adheres to the surface of the studs. Contrary to other foam products, foam sealant 412 does not expand beyond the initial diameter but rather retains its shape and does not sag down on studs 406.

Subsequently, the installer places substrate panel 404 over foam sealant 412 and pushes it in using both a long level as well as a square to the exact desired location, paying attention to the desired level of plumbness. The installer identifies ahead of time the studs that protrude most from the wall and will add screws between the substrate and those studs, to hold the board in place while the foam sealant 412 adheres to substrate panel 404 and begins to dry. With this method, foam sealant 412 automatically fills any voids needed between substrate panel 404 and studs 406. Excess foam extrudes on either side of studs 406 and remains there, which is not a problem as this gets hidden from view.

After foam sealant 412 dries up, foam sealant 412 does not expand any more. At that point, screws can be used to further attach substrate panel 404 to studs 406 for additional strength.

Figure 15:
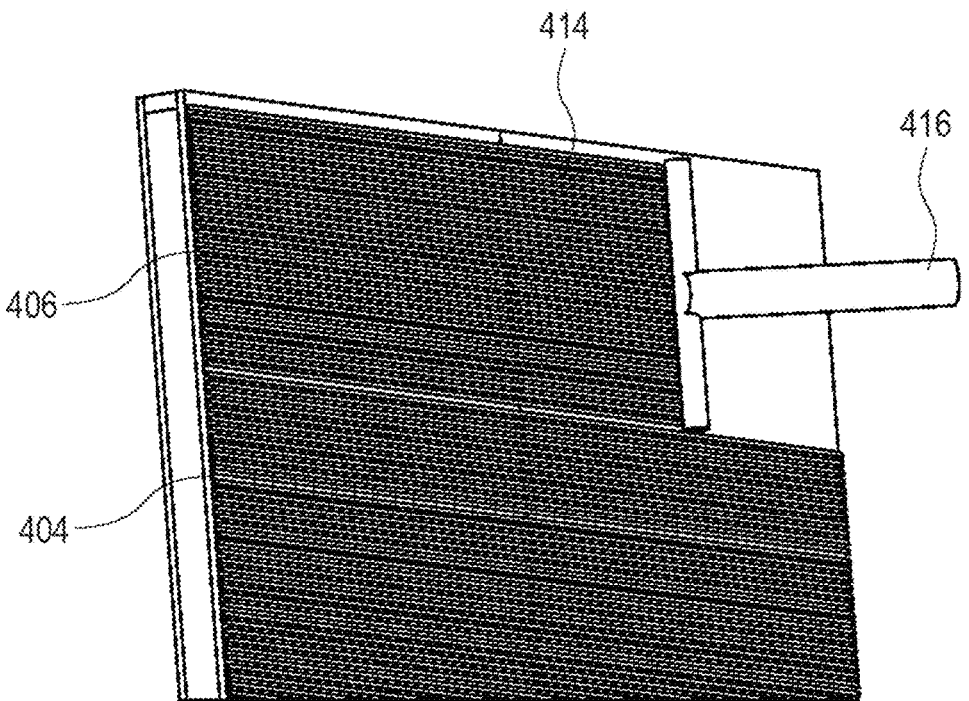
FIGS. 15 and 16 show a method of attaching porcelain panel to the substrate panel using silicone adhesive, in accordance with one embodiment of the present invention.
Figure 16:
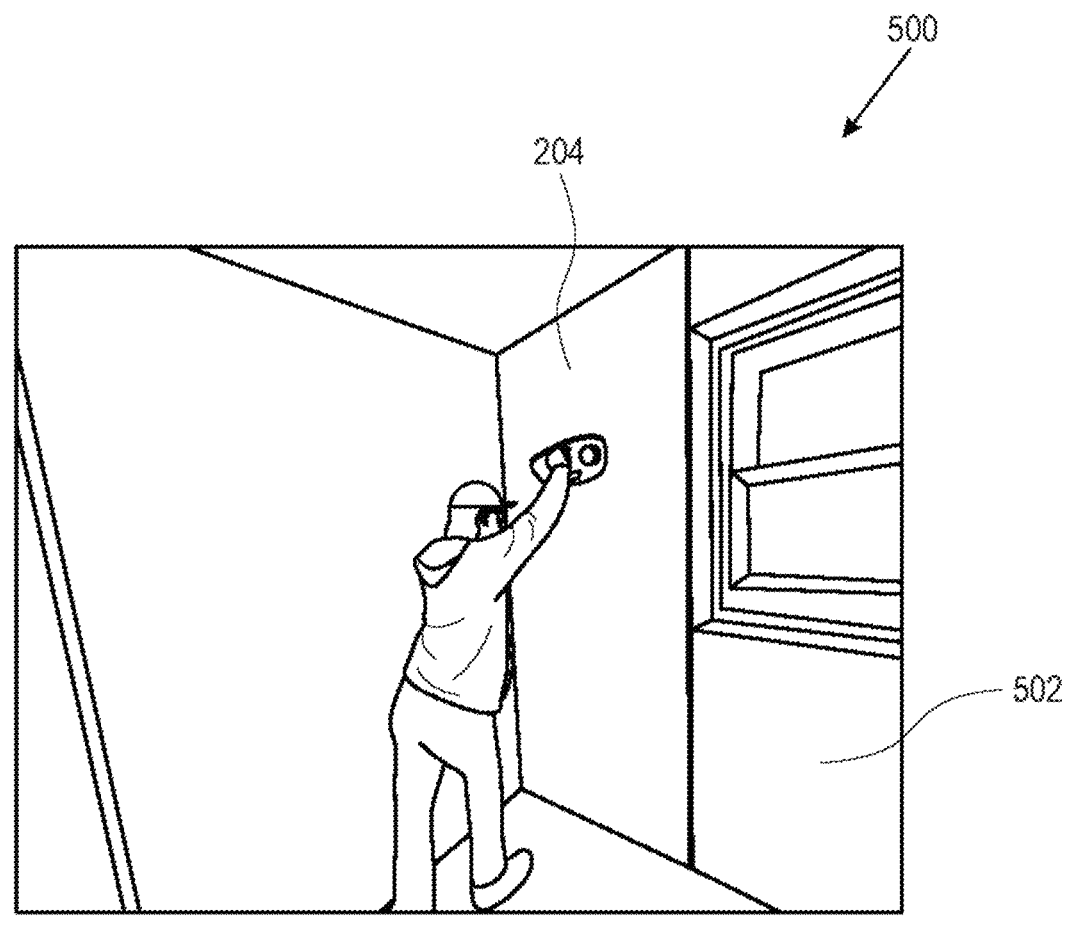

FIG. 15 shows a method/process by which polymer-based adhesive 414 is used to attach porcelain panel 408 to substrate panel 404. In one example, silicone adhesive 414 is spread onto substrate panel 404 using a specific spreader 416 that allows for a uniform bead of polymer-based adhesive 414 to be applied to substrate panel 404 at a distance and thickness such that polymer-based adhesive 414 spreads to achieve the 80 percent coverage guideline when the porcelain panel 408 is placed over it.

Polymer-based adhesive 414 is applied to any corners or seams in order to achieve required waterproofing. After polymer-based adhesive 414 is adequately applied to substrate panel 404 and all the corners, a precut porcelain panel 408 is adhered to the wall. Maximum adherence to substrate panel 404 is then achieved by applying pressure to porcelain panel 408 with a beating paddle.

The disclosed embodiment allows the installer to achieve both the flatness as well as the adhesive coverage required in a new and novel way to efficiently and adequately install porcelain slabs on walls, both wet (as in showers) and dry (as in fireplace surrounds and other walls) in about the same amount of time as currently required for acrylic walls which is significantly faster than the method currently employed in the industry of using thin set mortar. Therefore, the method/system in the disclosed invention enables porcelain slabs (GTPT) to entirely replace the acrylic panels in the one-day shower replacement market.

The system/method disclosed herein offers a rapid installation of large porcelain slabs in showers, for example. This process uses commercially available materials that are used in other applications, along with a unique methodology and tools to permanently and securely bond porcelain slabs to shower walls.

Figure 17:
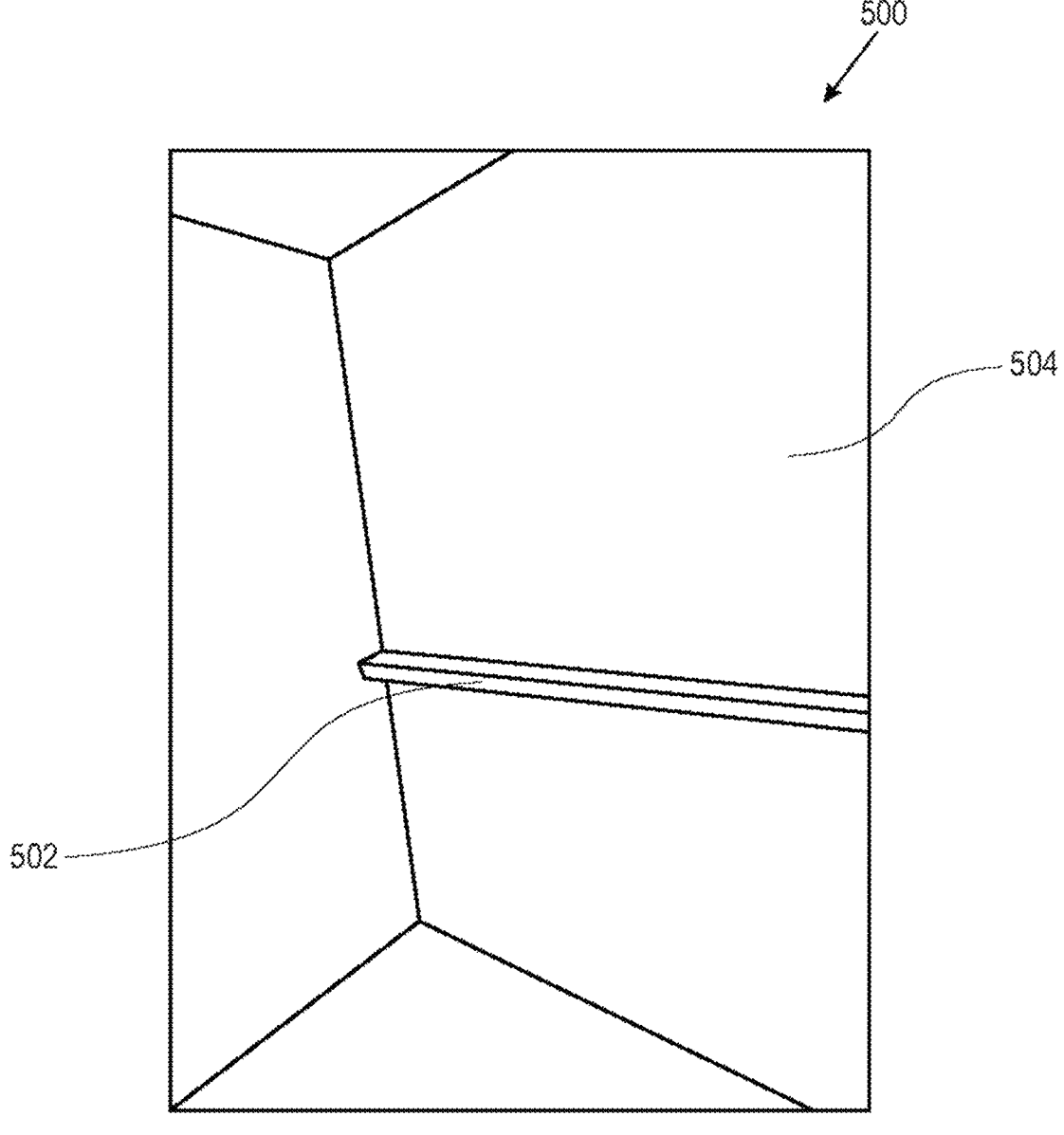
FIG. 17 is an environment in which a porcelain shelf attaches to a wall, in accordance with one embodiment of the present invention.

Now referring to FIG. 17, an environment 500 in which a porcelain shelf 502 implements is shown, in accordance with one embodiment of the present invention. Porcelain shelf 502, which consists of a prefabricated porcelain shelf 502 adhered to a waterproof core 506 mounts to a porcelain wall 504 with the strength and waterproofness required for the application. FIG. 18 shows a schematic cross-sectional views of porcelain shelf 502 attached to wall. Proper substrate (goboard substrate) 505 is attached to the studs 511 using screws 507 and the techniques illustrated in FIG. 14 and explained in this invention. However, to prevent water from penetrating the assembly where the shelf 502 will be attached, a stainless-steel z-channel flashing 512 is secured between the core 506 and the studs 511. The core 506 is attached to the studs 511 with the use of screws 508 that are inserted through a pre-drilled opening on the side of the core 506, through the z-channel flashing 512 and onto the studs. Once core 506 is firmly secured, the porcelain walls 504, cut to desired size, are adhered to the substrate as shown in FIG. 15 and following the techniques described in this invention. Adhesive 514 is then applied to the core and the prefabricated porcelain shelf 502 is inserted over the core. Once the shelf assembly is firmly in place, silicone caulk 513 is applied to the joint between the shelf 502 and the porcelain walls 504.

The above disclosed porcelain shelf 502 can be installed in both wet and dry environments. For example, porcelain shelf 502 can be used in showers.

The presently disclosed invention provides a complete system for cutting porcelain slabs and installing the cut porcelain slabs, which offer several advantages over prior art. Specifically, the presently disclosed invention provides a porcelain slab cutting table for cutting large porcelain slabs; a transport attachment that can be used for transporting porcelain slab and also as a cutting table whenever required (mobile porcelain slab cutting table attachment to the transport vehicle or glass carrier); a system/process for attaching porcelain slabs to walls; and a porcelain shelf attaching method.

The porcelain slab cutting table consists of components that allow cut porcelain slabs to desired size, without breakage. The mobile porcelain slab cutting table attachment allows for the efficient cutting of the porcelain slabs in the field (on-site) thereby solving the issue that currently results in slab breakage. The invention also offers a rapid installation of large porcelain slabs in showers. This process uses commercially available materials that are used in other applications, along with a unique methodology and tools to permanently and securely bond porcelain slabs to shower walls. Additionally, the invention provides a method/process of installing a porcelain shelf to the wall. The system provides a series of novel cutting tables and installation systems that integrate cutting and other functions in order to achieve total shower remodel from demolition to finished product using porcelain slabs within 8-16 working hours.

A person skilled in the art appreciates that the system for cutting porcelain slabs can come in a variety of shapes and sizes depending on the need and comfort of the user. Further, many changes in the design and placement of components may take place without deviating from the scope of the presently disclosed system for cutting and installing the porcelain slabs.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for use in a one-day bathroom or other residential room remodeling project through the rapid forming and preparing of a porcelain slab for use in said residential room remodeling project, said system comprising:

a porcelain slab cutting table for associating with a mobile service vehicle, comprising:

a base frame;

a top frame, wherein said top frame connects to said base frame via upstanding poles such that said top frame is in parallel with said base frame, and wherein said top frame presents a flat and continuous surface;

a U-shaped frame extending perpendicularly and away from said top frame; and a roller connecting said U-shaped frame, wherein said roller rotates upon applying pressure, wherein said porcelain slab cutting table is moved closer to a porcelain slab placed in a vertical position, and wherein said porcelain slab is flipped from said vertical position using said roller as a column support at a middle of said porcelain slab to place said porcelain slab in a horizontal position over said top frame without breaking said porcelain slab;

means for attaching said porcelain slab cutting table to said mobile service vehicle thereby permitting transport of said porcelain slab cutting table to selectable work locations;

means for attaching porcelain slabs to a wall of said residential room remodeling project; and means for attaching a porcelain shelf to a wall of said residential room remodeling project.

2. The system of claim 1, wherein said base frame comprises wheels for transporting said porcelain slab cutting table.

3. The system of claim 1, wherein said upstanding poles comprise cross-bars, and wherein said cross-bars extend from said upstanding poles and connect to said top frame for distributing the weight of said porcelain slab.

4. The system of claim 1, wherein said top frame comprises support bars, and wherein said support bars receive said porcelain slab in said horizontal position.

5. The system of claim 1, wherein said base frame comprises hooks, and wherein said hooks extend away from said base frame.

6. The system of claim 5, wherein said hooks removably receive a scoring tool.

7. The system of claim 6, wherein said scoring tool comprises a scoring wheel.

8. The system of claim 6, wherein said scoring tool is placed above said porcelain slab in order to score or scribe on said porcelain slab before said porcelain slab is snapped or cut.

9. A system for installing a porcelain slab for use in a remodeling project, said system comprising:

a porcelain slab cutting table, comprising:

a base frame;

a top frame, wherein said top frame connects to said base frame via upstanding poles such that said top frame is in parallel with said base frame, and wherein said top frame presents a flat and continuous surface means for attaching said porcelain slab cutting table to said mobile service vehicle thereby permitting transport of said porcelain slab cutting table to a selected work locations;

a U-shaped frame extending perpendicularly and away from said top frame;

a roller connecting said U-shaped frame, wherein said roller rotates upon applying pressure; and a scoring tool removably connected to said base frame, wherein said porcelain slab cutting table is moved closer to a porcelain slab placed in a vertical position, wherein said porcelain slab is flipped from said vertical position using said roller as a column support at a middle of said porcelain slab to place said porcelain slab in a horizontal position over said top frame without breaking said porcelain slab, and wherein said scoring tool is placed above said porcelain slab in order to score or scribe on said porcelain slab before said porcelain slab is snapped or cut;

means for attaching said porcelain slab cutting table to said mobile service vehicle thereby permitting transport of said porcelain slab cutting table to selectable work locations;

means for attaching porcelain slabs to a wall of said residential room remodeling project; and means for attaching a porcelain shelf to a wall of said residential room remodeling project.

10. The system of claim 9, wherein said base frame comprises wheels for transporting said porcelain slab cutting table.

11. The system of claim 9, wherein said upstanding poles comprise cross-bars, and wherein said cross-bars extend from said upstanding poles and connect to said top frame for distributing the weight of said porcelain slab.

12. The system of claim 9, wherein said top frame comprises support bars, and wherein said support bars receive said porcelain slab in said horizontal position.

13. The system of claim 9, wherein said base frame comprises hooks, and wherein said hooks extend away from said base frame.

14. The system of claim 13, wherein said hooks removably receive said scoring tool.

15. The system of claim 9, wherein said scoring tool comprises a scoring wheel, and wherein said scoring wheel scores or scribes on said porcelain slab.

16. A method of installing a porcelain slab, said method comprising the steps of:

providing a porcelain slab cutting table having a base frame;

providing a top frame presenting a flat and continuous surface, said top frame connecting said base frame via upstanding poles such that said top frame is in parallel with said base frame;

providing a U-shaped frame extending perpendicularly and away from said top frame;

providing a roller connecting said U-shaped frame, said roller configured for rotating upon applying pressure;

moving said porcelain slab cutting table closer to a porcelain slab placed in a vertical position; and flipping said porcelain slab from said vertical position using said roller as a column support at a middle of said porcelain slab for placing said porcelain slab in a horizontal position over said top frame without breaking said porcelain slab;

providing means for attaching said porcelain slab cutting table to said mobile service vehicle thereby permitting transport of said porcelain slab cutting table to selectable work locations;

providing means for attaching porcelain slabs to a wall of said residential room remodeling project; and providing means for attaching a porcelain shelf to a wall of said residential room remodeling project.

17. The method of claim 16, further comprising providing wheels at said base frame for transporting said porcelain slab cutting table.

18. The method of claim 16, further comprising:

providing a scoring tool comprising a scoring wheel; and scoring or scribing on said porcelain slab with said scoring tool before said porcelain slab is snapped or cut.

19. The method of claim 16, further comprising providing hooks at said base frame for removably placing said scoring tool.

20. The method of claim 16, further comprising:

providing support bars at said top frame for receiving said porcelain slab in said horizontal position; and providing cross-bars at said upstanding poles, said cross-bars extending from said upstanding poles and connecting to said top frame for distributing the weight of said porcelain slab.

* * * * *